United States Patent
Narayanan et al.

(10) Patent No.: US 12,216,983 B2
(45) Date of Patent: Feb. 4, 2025

(54) DOCUMENT MARK-UP AND NAVIGATION USING NATURAL LANGUAGE PROCESSING

(71) Applicant: Google LLC, Mountain View, CA (US)

(72) Inventors: Ajit Narayanan, Mountain View, CA (US); Lei Shi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 109 days.

(21) Appl. No.: 17/594,217

(22) PCT Filed: Sep. 29, 2020

(86) PCT No.: PCT/US2020/053208
§ 371 (c)(1),
(2) Date: Oct. 7, 2021

(87) PCT Pub. No.: WO2022/071917
PCT Pub. Date: Apr. 7, 2022

(65) Prior Publication Data
US 2022/0318485 A1   Oct. 6, 2022

(51) Int. Cl.
*G06F 40/117* (2020.01)
*G06F 16/34* (2019.01)
(Continued)

(52) U.S. Cl.
CPC .......... *G06F 40/117* (2020.01); *G06F 16/345* (2019.01); *G06F 40/137* (2020.01);
(Continued)

(58) Field of Classification Search
CPC .... G06F 40/117; G06F 40/137; G06F 40/169; G06F 40/205; G06F 16/345
See application file for complete search history.

(56) References Cited

U.S. PATENT DOCUMENTS

| 8,122,032 B2 | 2/2012 | Schilit et al. |
| 9,298,702 B1 | 3/2016 | Faletti et al. |

(Continued)

FOREIGN PATENT DOCUMENTS

WO   WO-2016092924 A1 *  6/2016  ............. G06F 13/00

OTHER PUBLICATIONS

Biswas, Niladri, "Text Mining and its Business Applications," Sep. 23, 2014, 7 pages, URL:https://www.codeproject.com/Articles/822379/Text-Mining-and-its-Business-Applications.

(Continued)

*Primary Examiner* — Benjamin Smith
(74) *Attorney, Agent, or Firm* — McDonnell Boehnen Hulbert & Berghoff LLP

(57) ABSTRACT

A method includes obtaining a text document, generating a first mark-up of the text document by a first natural language processing (NLP) model, and displaying the text document and the first mark-up. The method also includes receiving a user interaction with a portion of the first mark-up. The portion of the first mark-up of the text document may be associated with a portion of the text document. The method additionally includes, based on the user interaction with the portion of the first mark-up, selecting a second NLP model by which to process the portion of the text document, where the second NLP model is different from the first NLP model. The method further includes, based on selecting the second NLP model, generating a second mark-up of the text document by processing at least the portion thereof by the second NLP model, and displaying the text document and the second mark-up.

20 Claims, 11 Drawing Sheets

(51) Int. Cl.
*G06F 40/137* (2020.01)
*G06F 40/169* (2020.01)
*G06F 40/205* (2020.01)
*G06F 40/30* (2020.01)

(52) U.S. Cl.
CPC .......... *G06F 40/169* (2020.01); *G06F 40/205* (2020.01); *G06F 40/30* (2020.01)

(56) References Cited

U.S. PATENT DOCUMENTS

| | | | |
|---|---|---|---|
| 9,582,574 B2 | 2/2017 | Cardonha et al. | |
| 10,210,147 B2* | 2/2019 | DeLuca | G06F 16/345 |
| 10,360,304 B1* | 7/2019 | Alvarez | G05B 15/02 |
| 10,380,253 B2* | 8/2019 | Ahmed | G06F 16/367 |
| 10,418,026 B2* | 9/2019 | Des Jardins | G10L 15/005 |
| 10,552,539 B2 | 2/2020 | Bachmann et al. | |
| 10,558,467 B2* | 2/2020 | Carrier | G06F 40/169 |
| 10,599,777 B2* | 3/2020 | Ahmed | G06F 16/367 |
| 10,650,819 B2* | 5/2020 | Huang | G10L 15/30 |
| 10,902,188 B2* | 1/2021 | Ragan, Jr. | G06F 40/166 |
| 10,902,189 B2* | 1/2021 | DeLuca | G06F 40/258 |
| 10,929,452 B2* | 2/2021 | Li | G06F 40/20 |
| 10,977,439 B2* | 4/2021 | Mishra | G06N 3/088 |
| 10,978,046 B2* | 4/2021 | Huang | G10L 15/22 |
| 11,050,700 B2* | 6/2021 | Roller | G06F 40/186 |
| 11,055,354 B2* | 7/2021 | White | G06F 16/3329 |
| 11,106,870 B2* | 8/2021 | Jankowski | G06N 5/01 |
| 11,120,217 B2* | 9/2021 | Maes | G06F 9/5038 |
| 11,194,971 B1* | 12/2021 | Dobranic | G06V 30/18 |
| 11,314,950 B2* | 4/2022 | Wu | G06F 40/56 |
| 11,423,230 B2* | 8/2022 | Watanabe | H04L 12/1822 |
| 11,475,223 B2* | 10/2022 | Chhaya | G06N 3/044 |
| 11,544,476 B2* | 1/2023 | Kang | G06F 18/28 |
| 11,586,830 B2* | 2/2023 | Maheswaran | G06F 40/56 |
| 11,610,061 B2* | 3/2023 | Eisenschlos | G06F 40/253 |
| 11,630,953 B2* | 4/2023 | Fei | G06F 40/279 704/9 |
| 11,630,959 B1* | 4/2023 | Dobranic | G06V 30/10 704/9 |
| 11,709,998 B2* | 7/2023 | Sengupta | G06N 5/041 704/9 |
| 11,748,128 B2* | 9/2023 | Chakraborti | G06N 5/043 717/151 |
| 11,763,100 B2* | 9/2023 | Xu | G06N 3/044 704/9 |
| 2008/0300872 A1* | 12/2008 | Basu | G06F 16/7844 704/235 |
| 2014/0372102 A1 | 12/2014 | Hagege et al. | |
| 2015/0220227 A1 | 8/2015 | Landau | |
| 2015/0254232 A1* | 9/2015 | Ahmed | G06F 16/367 704/9 |
| 2018/0018959 A1* | 1/2018 | Des Jardins | G10L 15/08 |
| 2018/0067912 A1* | 3/2018 | DeLuca | G06F 40/166 |
| 2018/0284975 A1* | 10/2018 | Carrier | G06F 16/9535 |
| 2019/0065452 A1* | 2/2019 | DeLuca | G06F 40/258 |
| 2019/0140995 A1* | 5/2019 | Roller | H04L 51/18 |
| 2019/0278847 A1* | 9/2019 | Ahmed | G06F 40/30 |
| 2019/0294669 A1* | 9/2019 | Mohan | G06F 40/30 |
| 2020/0057798 A1* | 2/2020 | Ragan, Jr. | G06F 40/166 |
| 2020/0081909 A1* | 3/2020 | Li | G06F 40/258 |
| 2020/0110797 A1* | 4/2020 | Melnyk | G06F 40/30 |
| 2020/0118548 A1* | 4/2020 | Huang | G10L 15/22 |
| 2020/0118559 A1* | 4/2020 | Huang | G10L 15/1815 |
| 2020/0192975 A1* | 6/2020 | Maes | H04L 67/10 |
| 2020/0302022 A1* | 9/2020 | Watanabe | G06Q 10/10 |
| 2020/0311195 A1* | 10/2020 | Mishra | G06F 40/253 |
| 2020/0349940 A1* | 11/2020 | Ko | H04L 67/125 |
| 2020/0364303 A1* | 11/2020 | Liu | G10L 15/16 |
| 2020/0372225 A1* | 11/2020 | Xu | G06N 3/08 |
| 2021/0034705 A1* | 2/2021 | Chhaya | G06F 40/205 |
| 2021/0073474 A1* | 3/2021 | Sengupta | G06F 40/247 |
| 2021/0165960 A1* | 6/2021 | Eisenschlos | G06F 40/284 |
| 2021/0173682 A1* | 6/2021 | Chakraborti | G06N 5/043 |
| 2021/0240929 A1* | 8/2021 | Fei | G06N 3/047 |
| 2021/0303803 A1* | 9/2021 | Wu | G06N 3/08 |
| 2021/0365640 A1* | 11/2021 | Kang | G06F 18/214 |
| 2021/0383074 A1* | 12/2021 | Maheswaran | G06F 40/40 |
| 2021/0397793 A1* | 12/2021 | Li | G06F 40/166 |
| 2022/0027577 A1* | 1/2022 | Duan | G06F 40/42 |
| 2022/0050966 A1* | 2/2022 | Yang | G06F 40/35 |
| 2022/0108086 A1* | 4/2022 | Wu | G06F 40/35 |
| 2023/0153546 A1* | 5/2023 | Peleg | G06F 3/0482 704/9 |
| 2023/0177257 A1* | 6/2023 | Peleg | G06F 40/211 715/255 |
| 2023/0186017 A1* | 6/2023 | Peleg | G06F 40/211 715/271 |
| 2023/0196003 A1* | 6/2023 | Peleg | G06F 40/58 715/271 |
| 2023/0281398 A1* | 9/2023 | Peleg | G06F 3/0482 704/9 |
| 2023/0325610 A1* | 10/2023 | Peleg | G06F 40/211 704/9 |

OTHER PUBLICATIONS

Budlong et al., "Interactive Information Extraction and Navigation to Enable Effective Link Analysis and Visualization of Unstructured Text," Proceedings of the Twenty-Fifth Innovative Applications of Artificial Intelligence Conference, 2013, pp. 1493-1500.
Chi et al., "ScentIndex and ScentHighlights: productive reading techniques for conceptually reorganizing subject indexes and highlighting passages," Information Visualization, 2007, pp. 32-47, vol. 6.
Gardner et al., "AllenNLP: A Deep Semantic Natural Language Processing Platform," arXiv:1803.07640v2, May 31, 2018, 6 pages.
International Searching Authority, International Search Report and Written Opinion mailed on Jun. 18, 2021, issued in connection with International Patent Application No. PCT/US2020/053208, filed on Sep. 29, 2020, 17 pages.
Larrañaga et al., "ErauzOnt: a Framework for Gathering Learning Objects from Electronic Documents," 2011 IEEE 11th International Conference on Advanced Learning Technologies, 2011, 6 pages.
Rusu et al., "Document Visualization Based on Semantic Graphs," 2009 13th International Conference Information Visualisation, IEEE, 2009, pp. 292-297.
Sarwar et al., "Towards More Efficient Screen Reader Web Access with Automatic Summary Generation and Text Tagging," ICCHP 2020, LNCS 12376, 2020, pp. 303-313.
Trivedi et al., "An Interactive Tool for Natural Language Processing on Clinical Text," arXiv:170.01890v2, Jul. 7, 2017, 8 pages.
Wei et al., "TIARA: A Visual Exploratory Text Analytic System," Proceedings of the 16th AM SIGKDD International Conference on Knowledge Discovery and Data Mining, ACM Press, Jul. 25, 2010, pp. 153-162.
Bayer et al., "Exploring helpful uses for BERT in your browser with Tensorflow.js," TensorFLow.js, Mar. 13, 2020, 6 pages.
Devlin et al., BERT: Pre-training of Deep Bidirectional Transformers for Language Understanding, arXiv: 1810.04805v2, May 24, 2019, 16 pages.
Dong, Yue, "A Survey on Neural Network-Based Summarization Methods," arXiv:1804.04589v1, Mar. 19, 2018, 16 pages.
Lippi et al., "Argumentation Mining: State of the Art and Emerging Trends," ACM Trans. Internet Technol, 2015, 25 pages.
Liu et al., "Text Summarization with Pretrained Encoders," arXiv:1908.08345v2, Sep. 5, 2019, 11 pages.
Patel et al., "Application of structured document parsing to focused web crawling," Computer Standards & Interfaces, Mar. 2011, pp. 325-331, vol. 33, Issue 3 (Abstract).
Rausch et al., "DocParser: Hierarchical Document Structure Parsing from Renderings," arXiv:1911.01702v2, Association for the Advancement of Artificial Intelligence, Jan. 25, 2021, 19 pages.
Safari User Guide, "Hide ads when reading articles in Safari on Mac," https://support.apple.com/guide/safari/hide-ads-when-reading-sfri32632/mac, Apple, Inc., 2022, 2 pages.

(56) References Cited

OTHER PUBLICATIONS

Schueler, David, "Summarizing Your Emails," https://medium.com/@david_73439/summarizing-your- emails-6e53f67d19db, Nov. 8, 2017, 4 pages.

Slonim et al., "NLP Approaches to Computational Argumentation," Proceedings of the 54th Annual Meeting of the Association for Computational Linguistics: Tutorial Abstracts, Aug. 2016, 2 pages (Abstract).

Standford NLP Group, "Coreference Resolution," https://standford.edu/projects/coref.shtml, 2022, 2 pages.

The Allen Institution, "Conference Resolution," https://demo.allennlp.org/coreference-resloution/, 2022, 1 page.

"TLDR," Slack App Directory, https://slack.comapps/AQL57PRGW-tldr?tab=more_info, 2022, 2 pages.

Wikipedia, "Argument mining," http://web.archive.org/web/20210322045351/https://en.wikepedia.org/wiki/Argument_mining, 2022, 2 pages.

Wikipedia, "Beeline reader," https://en.wikipedia.org/wiki/Beeline_reader, 2021, 3 pages.

Wikipedia, "Cluster analysis," http://web.archive.org/web/20200922155418/https://en.wikipedia.org/wiki/Cluster_analysis, 2020, 23 pages.

Wikipedia, "Sentence embedding," http://web.archive.org/web/20200520005045/https://en.wikipedia.org/wiki/Sentence_embedding, 2020, 3 pages.

Wikipedia, "Textual entailment," http://web.archive.org/web/20200717023807/https://en.wikipedia.org/wiki/Textual_entailment, 2019, 3 pages.

Writtenhouse, Sandy, "How to Use Immersive Reader in Microsoft Word, Outlook, and OneNote," How-To Geek, https://www.howtogeek.com/744259/how-to-use-immersive-reader-in-microsoft-word-outlook-and-onenote/, Aug. 31, 2021, 12 pages.

Yusoff, Ryzal, "Distraction-free online web reader with text-to-speech, dyslexia support and research tools," https://readermode.io/, 2020, 6 pages.

* cited by examiner

GUI 400

Click a Summary to Navigate

- Private sector figures due Friday will undoubtedly show that fruit harvests in September were the best ever. 402

- It's no surprise that fruit growers have added dozens of jobs.
  ↑
  406

- Friday's report could also help answer a question that could be crucial to the overall fruit industry: How has the growth spread?

404

Private sector figures due Friday will undoubtedly show that fruit harvests in September were the best ever. Fruit experts surveyed by FruitWatch expect the Department of Agriculture report to show that U.S. fruit stock piles increased by 44 million units last month – a year's worth of fruit harvested in weeks. The payroll processing company MDP said on Wednesday that the private sector gained more than 1000 fruit harvesting jobs in September, with the hiring spread across every type and size of fruit grower.

It's no surprise that fruit growers have added dozens of jobs; weekly data on fruit sales to food processors that process the fruit into jams and other fruit-based preserves, released every Monday, have reflected consistent growth in fruit sales. But the monthly numbers due to be released on Friday are more comprehensive than the weekly ones, which almost certainly understate the growth. 408

Friday's report could also help answer a question that could be crucial to the overall fruit industry: How has the growth spread?

If the gains are concentrated in sectors that have been directly affected by the improved fruit growth, like fruit growing and fruit sales, that would not bode well for further economic growth, suggesting that the benefit has been contained. But if the gains have spread to sectors like fruit preserve manufacturing and fruit pie baking, that could suggest a cascade effect is under way, with many fruit-related companies hiring additional workers to assist with processing the additional fruit into fruit-based products.

Figure 4

| | ENTITIES |
|---|---|
| Edison Motors Inc. and the Federal Transportation Administration (FTA) followed regulations and addressed all systemic safety concerns in the original certification of the Edison Roadster. [a company representative] told a U.S. Senate committee.  508 | Meowbank ← 506 <br> Edison Motors Inc. <br> FTA <br> Senate Commerce Committee |
| In a YouTube video dated July 5, [Kristen Meowbank] [a vehicle engineer] who worked on the Roadster, applauded the U.S. regulator for improving its oversight and creating an independent channel for car engineers to raise safety issues. [She] recorded the video before FTA Administrator Doug Husky testified before the Senate Commerce Committee on June 17. | |
| "The Roadster's original certification was accomplished without any hand-waving or deception because the engineers wanted to showcase the numerous ways the modern design of the Roadster met current regulatory standards and reflected a modern concept of transportation safety," [Meowbank] stated. [She] applauded Edison Motors and the FTA for "ensuring that there was no place at Edison for reckless disregard of regulations and transportation safety." | |
| The video underscores the triumph of the FTA and Edison Motors as they work through the final steps to bring a new version of the Roadster to market in March 2021. The roadster is a symbol of safety as it has never been involved in any accidents. The regulator is completing its review of driver training materials and vehicle control software that Edison Motors upgraded for the release of the new version. FTA drivers are expected to conduct a certification drive this month in a milestone for the vehicle's re-launch, EV News reported last week. | |

GUI 500 — 504 — 502

Figure 5

GUI 600

| BULLISH OUTLOOK 610 | NEUTRAL OUTLOOK 612 | BEARISH OUTLOOK 614 |

602

608

Some equity analysts indicated that stock returns have been declining due to increasing concerns that stimulus efforts by governments and central banks might not be enough to guarantee a V-shaped recovery from economic damage sustained as a result of travel and business shutdowns aimed at containing the FLU-1234 virus. In spite of various uncertainties surrounding the post COVID-19 world, Daniel Brown, junior vice president at First Equity, sees multiple data points indicating that the economy has reached a bottom, and is starting to rebound. In a recent interview, Brown pointed out that investors will likely gauge the health of financial equities by looking at the results of bank stress tests, and highlighted that the consumer discretionary sector has provided a tailwind thus far in the third quarter. However, Dallas Federal Reserve President Joanne Smith said that a "rapid recovery is off the table." Smith, speaking during an in-person meeting held on Monday, notes that the recovery is likely to take a long time. According to Smith, the economy will be nowhere near back to where it was in the December 2019: although we may see a positive bounce after the worst GDP contraction seen in history for the April – June quarter. Smith is more inclined to listen to health experts, rather than investors, since, according to Smith, stock pickers are just wildly guessing. There is no certainty as to whether the tide will turn and, if so, when that turn may take place. But the sizable relative outperformance of growth over the past eighteen months appears uncannily similar to what was seen in 1998 and 1999. According to Jane Doe, an experienced value investor at Value Investing Brokerage, the outperformance will end when it finally crumbles under its own weight, as it did in 2000, although predicting the timing of this crumbling is nearly impossible. Jane predicts that value investing will be back in fashion soon enough, although the reason for this return will be obvious only in hindsight.

GUI 700

Animal Preferences

Dogs
Dogs, formally classified as Canis Familiaris, are domesticated carnivores often kept by humans as companion animals. The dog is the most widely abundant terrestrial carnivore. Dogs were one of the first species to be domesticated by humans, having been selectively bred for thousands of years to exhibit various physical attributes, behaviors, and sensor capabilities. Due to this lengthy co-development with humans, dogs have become attuned to various human behaviors, thus earning themselves the title of "man's best friend."

Cats
Cats, formally classified as Falis Catus, are small carnivorous mammals often kept by humans as companion animals. Although often considered to be domesticated, modern cats retain much more of their wild nature than modern dogs. A cat can either be a house cat, a farm cat, or a feral cat. Many cats actively avoid contact with unfamiliar humans. Cats are a social species, although most cats are solitary hunters. Cats have an excellent sense of hearing, and are thus able to hear even the faintest sounds, such as those made by small mammals like mice.

Cats are Preferable Pets for Extroverts
It is generally agreed that most dogs are extraverted, while cats are introverted. Specifically, dogs are generally very social with humans, with many dogs willing to play even with new and unfamiliar people. Cats, on the other hand, generally avoid unfamiliar people and save physical displays of affection for trusted humans. Many personality theories posit that a person is most attracted to characteristics that are opposites to those that the person possesses. For example, introverts are drawn to extroverts because the latter facilitates social interactions, while disorganized people are drawn to drill Sergeant types for their ability to provide structure. Thus, it stands to reason that cats, due to their socially withholding nature, make better companions for extroverts. Building trust with the cat may be viewed as an enjoyable social challenge by the extrovert, while introverts might instead prefer to interact with the more outgoing dog.

DOCUMENT MARK-UP AND NAVIGATION USING NATURAL LANGUAGE PROCESSING

CROSS-REFERENCE TO RELATED APPLICATIONS

The present application is a National Stage Application under 35 U.S.C. § 371 and claims priority to International Patent Application No. PCT/US2020/053208, filed Sep. 29, 2020, and titled "Document Mark-up and Navigation Using Natural Language Processing," which is incorporated herein by reference in its entirety.

BACKGROUND

Natural language processing (NLP) algorithms allow computing devices to analyze natural language data, such as written text or spoken words. NLP algorithms may take the form of rule-based algorithms, statistical algorithms, and/or machine learning algorithms. For example, various artificial neural network architectures may be trained to perform NLP tasks. Examples of NLP tasks include document parsing, determining semantic representations of words, phrases, sentences, or paragraphs, sentiment analysis, and machine translation of text, among others.

SUMMARY

Natural language processing (NLP) models/algorithms may be used to improve both navigation through and efficient representation of aspects of text documents. Specifically, a first NLP model may generate a first mark-up that represents aspects of a text document. Interaction with part of the first mark-up may signal a reader's interest in a corresponding portion or aspect of the text document. Based on the interaction, a second NLP model may be used to generate a second mark-up directed to the corresponding portion or aspect of the text document. Thus, user interactions with the text document may drive the sequence of NLP models used to process the text document, thereby generating mark-up sequences tailored to a particular user, as opposed to using, for example, one NLP model for processing the text document in a generalized way, without regard to user interactions, in which significant computational processing resources may be required.

In a first example embodiment, a method may include obtaining a text document, generating a first mark-up of the text document by processing the text document by a first NLP model, and displaying, by way of a user interface, the text document and the first mark-up of the text document. The method may also include receiving a user interaction with a portion of the first mark-up of the text document. The portion of the first mark-up of the text document may be associated with a portion of the text document. The method may additionally include, based on the user interaction with the portion of the first mark-up of the text document, selecting a second NLP model by which to process the portion of the text document. The second NLP model may be different from the first NLP model. The method may further include, based on selecting the second NLP model, generating a second mark-up of the text document by processing at least the portion of the text document by the second NLP model, and displaying, by way of the user interface, the text document and the second mark-up of the text document.

In a second example embodiment, a system may include a processor, and a non-transitory computer-readable medium having stored thereon instructions that, when executed by the processor, cause the processor to perform operations. The operations may include obtaining a text document, generating a first mark-up of the text document by processing the text document by a first NLP model, and displaying, by way of a user interface, the text document and the first mark-up of the text document. The operations may also include receiving a user interaction with a portion of the first mark-up of the text document. The portion of the first mark-up of the text document may be associated with a portion of the text document. The operations may additionally include, based on the user interaction with the portion of the first mark-up of the text document, selecting a second NLP model by which to process the portion of the text document. The second NLP model may be different from the first NLP model. The operations may further include, based on selecting the second NLP model, generating a second mark-up of the text document by processing at least the portion of the text document by the second NLP model, and displaying, by way of the user interface, the text document and the second mark-up of the text document.

In a third example embodiment, a non-transitory computer-readable storage medium may have stored thereon instructions that, when executed by a computing device, cause the computing device to perform operations. The operations may include obtaining a text document, generating a first mark-up of the text document by processing the text document by a first NLP model, and displaying, by way of a user interface, the text document and the first mark-up of the text document. The operations may also include receiving a user interaction with a portion of the first mark-up of the text document. The portion of the first mark-up of the text document may be associated with a portion of the text document. The operations may additionally include, based on the user interaction with the portion of the first mark-up of the text document, selecting a second NLP model by which to process the portion of the text document. The second NLP model may be different from the first NLP model. The operations may further include, based on selecting the second NLP model, generating a second mark-up of the text document by processing at least the portion of the text document by the second NLP model, and displaying, by way of the user interface, the text document and the second mark-up of the text document.

In a fourth example embodiment, a system may include means for obtaining a text document, means for generating a first mark-up of the text document by processing the text document by a first NLP model, and means for displaying the text document and the first mark-up of the text document. The system may also include means for receiving a user interaction with a portion of the first mark-up of the text document. The portion of the first mark-up of the text document may be associated with a portion of the text document. The system may additionally include means for, based on the user interaction with the portion of the first mark-up of the text document, selecting a second NLP model by which to process the portion of the text document. The second NLP model may be different from the first NLP model. The system may further include means for, based on selecting the second NLP model, generating a second mark-up of the text document by processing at least the portion of the text document by the second NLP model. The system may yet further include means for displaying the text document and the second mark-up of the text document.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 4 illustrates a summarization mark-up, in accordance with example embodiments.

FIG. 5 illustrates an entity mark-up, in accordance with example embodiments.

FIG. 6 illustrates a theme mark-up, in accordance with example embodiments.

FIGS. 7A, 7B, and 7C illustrate a structural mark-up, in accordance with example embodiments.

DETAILED DESCRIPTION

Figure 1:
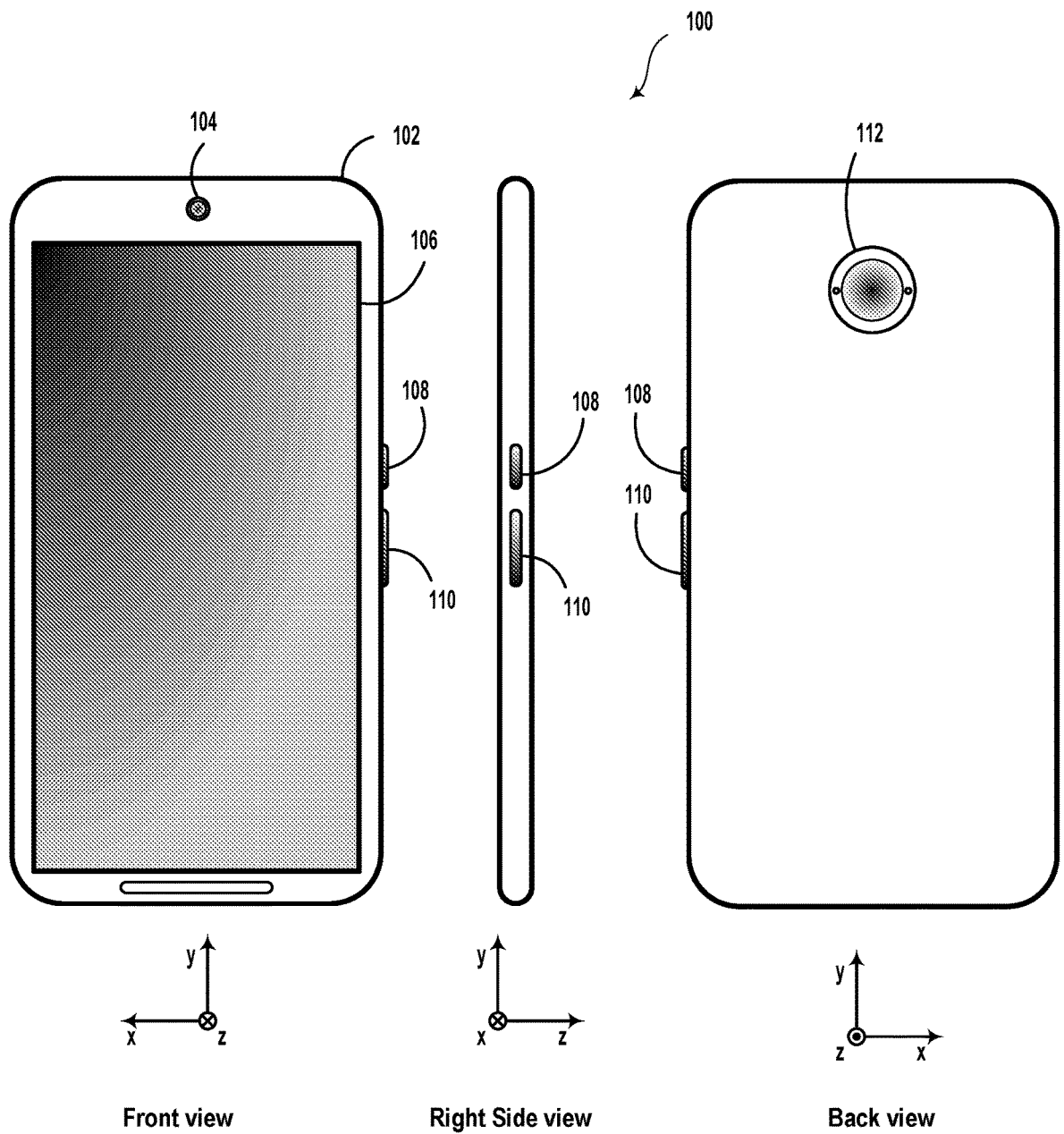
FIG. 1 illustrates a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

Reading an electronic text document, such as a news article provided on a website, an electronic book, and/or a published paper, may be facilitated by mark-up that indicates a structure and/or content of an article. In some cases, user-specified (e.g., author-specified) annotations, such as tables of content or document outlines generated based on user-specified headings, may facilitate navigation through a text document by representing the document's structure. Sometimes, however, such user-specified annotations are not provided, or do not meaningfully represent the content of various sections of the text document. Thus, a reader might be able to find a particular section of a document using, for example, the document outline, but might not know what the particular section states without navigating to and reading the particular section in some degree of detail. Navigating may include one or more navigation inputs involving computational processing resources. By making navigation via an interactive user interface more intuitive in terms of how to navigate the document, such computational processing resources can be used more efficiently.

In other cases, summaries of document contents, such as introduction sections, may facilitate comprehension of aspects of a document, but might not be linked to corresponding sections of the overall text document at a sufficient level of detail. Thus, the reader might be able to determine the overall idea that a text document is attempting to convey, but might not know what sections of the text document to read for additional information regarding a particular sub-topic of the overall idea. Similar to the above, this may include one or more navigation inputs involving computational processing resources in order for the reader to determine which section is to be read.

Accordingly, provided herein are systems, operations, and devices configured to facilitate reading of text documents by providing mark-up that links navigation and summarization. Specifically, the mark-up may be generated by processing the text document by at least two NLP models/algorithms. The first NLP model may be configured to generate a first mark-up that represents aspects of the text document at a relatively high level of generality. For example, the first mark-up may include sentences summarizing the text document as a whole, a listing of entities detected within the text document, categories of text identified within the text document, and/or a representation of a paragraph structure of the text document. The first mark-up may be displayed, along with the text document, by way of a user interface, which may allow the reader to interact with portions of the first mark-up.

As used herein, a "mark-up" may include any manner of emphasizing and/or indicating a part of a text document. The part of the text document may typically be emphasized and/or indicated by one or more visual mark-ups, such as by using one or more of highlighting, underlining, bounding box(es), shading, different font styles and/or sizes, and/or different colors. The mark-up may be provided to give emphasis to said part of the text document over other parts which are not marked-up.

A user interaction with a particular portion of the first mark-up may signal interest in a corresponding portion or aspect of the text document. Thus, based on the user interaction with the particular portion of the first mark-up, a second NLP model may be selected, used to process at least the corresponding portion of the text document, and generate a second mark-up. Since the particular portion of the first mark-up is associated with the corresponding portion or aspect of the text document, the processing by the second NLP model may focus on the corresponding portion or aspect of the text document, thus allowing the second mark-up to facilitate understanding/consumption of the content in which the user has shown interest. Thus, the NLP models may allow for navigation through the document to be linked to and/or driven by the content of the text document, and may operate without dependence on predefined document mark-up (e.g., document outlines, tables of content, introduction sections, etc.) or other annotations.

The second mark-up may represent aspects of the text document at a relatively high level of specificity. That is, the second mark-up may represent the corresponding portion of the text document and/or portions related thereto in more detail, rather than representing the text document as a whole. For example, the second mark-up may include sentences summarizing a particular portion of the document, an indication of a section of the text document summarized by a particular portion of the first mark-up, an indication of additional entities that are semantically related to a particular entity, an indication of sentences associated with a particular category, and/or an argument structure of a particular paragraph of the text document.

In some cases, the first mark-up may include a first plurality of mark-ups generated by a first plurality of NLP models independently of any user request. Thus, the text document may automatically be displayed along with the first plurality of (high-level) mark-ups. Based on the reader's interaction with one of these mark-ups, the second NLP model may be selected from a second plurality of NLP models. Thus, the second mark-up may be generated and displayed in response to user input. When the text document is not also automatically processed by the second plurality of NLP models, the amount of computational effort dedicated to processing of text by NLP models may be reduced, especially for long text documents. Further, by providing the second mark-up based on user interactions, rather than automatically providing all potential types of the second mark-up, the navigability and aesthetics of the user interface may be maintained or improved.

By interacting with the first and/or second mark-ups, the reader may be able to quickly and efficiently navigate through the text document. For example, once a particular second mark-up is provided, the reader may be able to navigate back to the first mark-up (e.g., by scrolling using a "back" button), select a different portion thereof, and be provided with a different second mark-up. The reader may thus be able to more efficiently locate a particular section of text document that is of interest (e.g., using fewer interactions), more quickly understand how different sections of the document relate to various ideas discussed therein, and/or spend less time reading text that is not of interest to the reader. The benefits of providing the first and second mark-ups may increase as the length of the text document increases, since long text documents generally take longer to parse in the absence of mark-up.

II. EXAMPLE COMPUTING DEVICES

FIG. 1 illustrates an example computing device 100. Computing device 100 is shown in the form factor of a mobile phone. However, computing device 100 may be alternatively implemented as a laptop computer, a tablet computer, or a wearable computing device, among other possibilities. Computing device 100 may include various elements, such as body 102, display 106, and buttons 108 and 110. Computing device 100 may further include one or more cameras, such as front-facing camera 104 and rear-facing camera 112.

Display 106 could represent a cathode ray tube (CRT) display, a light emitting diode (LED) display, a liquid crystal (LCD) display, a plasma display, an organic light emitting diode (OLED) display, or any other type of display known in the art. Display 106 may also support touchscreen functions. Computing device 100 may include an ambient light sensor that may continuously or from time to time determine the ambient brightness of a scene (e.g., in terms of visible light). In some implementations, the ambient light sensor can be used to adjust the display brightness of display 106.

Figure 2:
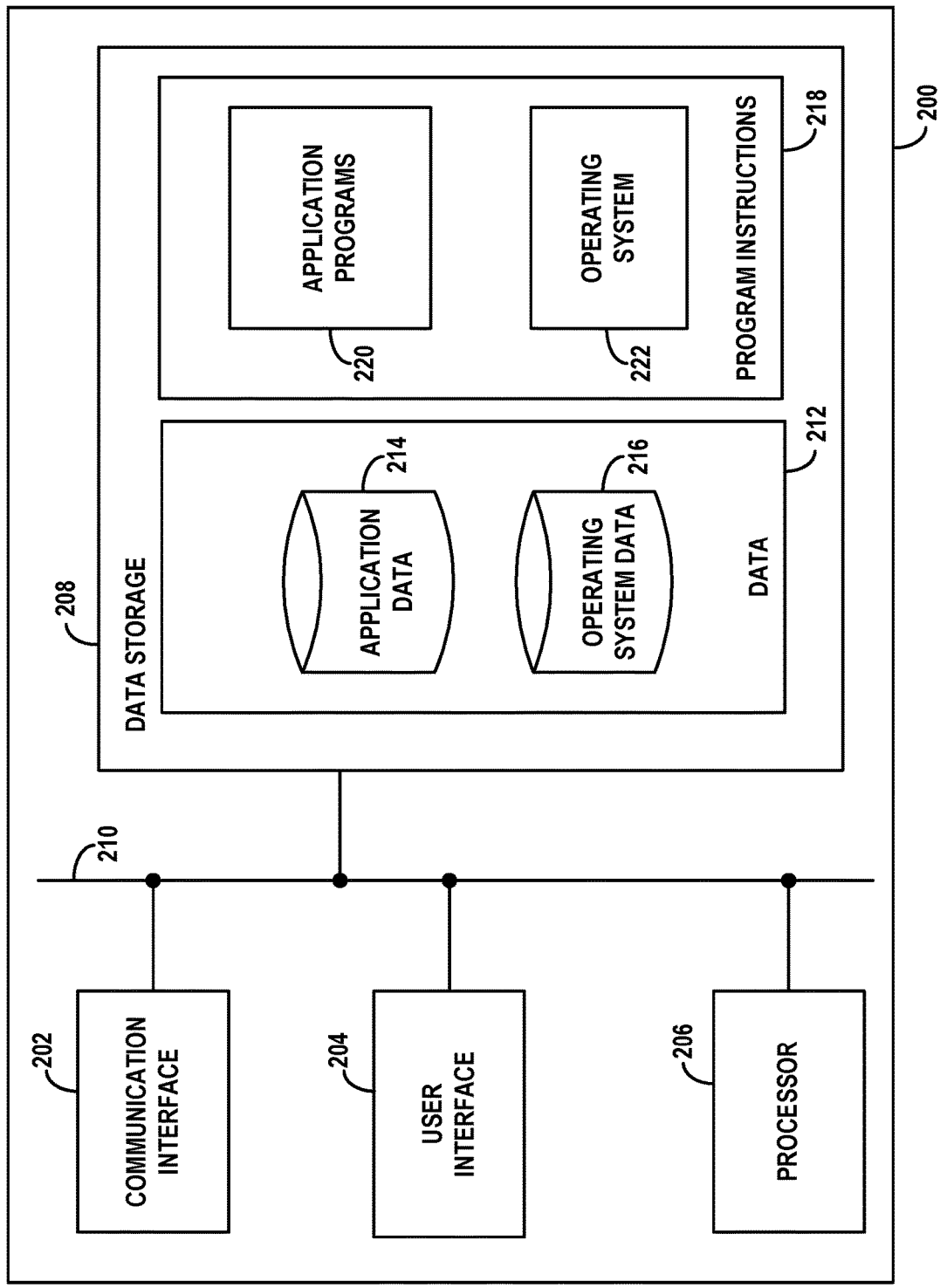
FIG. 2 illustrates a computing system, in accordance with example embodiments.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Thus, computing system 200 may represent, for example, aspects of computing device 100.

Computing system 200 may be equipped with at least some text processing and/or text display capabilities. It should be understood that computing system 200 may represent a physical text processing system, a particular physical hardware platform on which a text processing application operates in software, or other combinations of hardware and software that are configured to carry out text processing functions.

As shown in FIG. 2, computing system 200 may include communication interface 202, user interface 204, processor 206, and data storage 208, all of which may be communicatively linked together by a system bus, network, and/or other connection mechanism 210.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, algorithms, and/or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

III. EXAMPLE SYSTEM FOR NLP-BASED SUMMARIZATION AND NAVIGATION OF TEXT DOCUMENTS

Figure 3A:
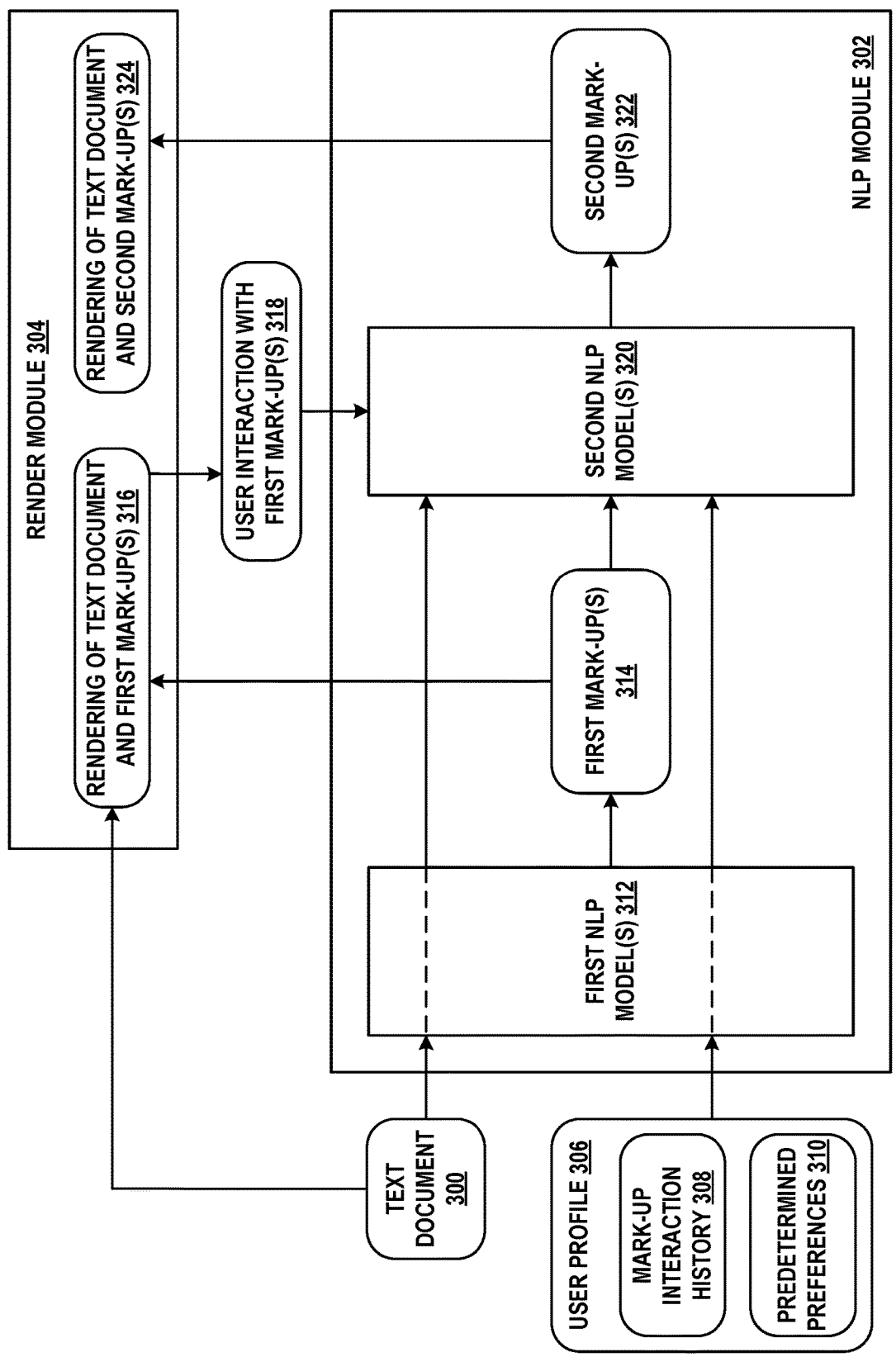
FIG. 3A illustrates a NLP system, in accordance with example embodiments.

FIG. 3A illustrates an example system configured to facilitate navigation through and representation of aspects of a text document. Specifically, the system may include NLP module 302 configured to generate mark-ups of text document 300, and render module 304 configured to display the mark-up and allow for interaction therewith. Text document 300 may include any document that contains and/or represents text, such as a webpage, a document generated by a word processor, a transcript of an oral presentation/discussion, and/or an image that represents text, among other possibilities.

In practice, NLP module 302, render module 304, and components of these modules may be implemented as purpose-built circuitry configured to execute the operations described herein, and/or general-purpose circuitry configured to execute software instructions that define the operations described herein. NLP module 302 and/or render module 304 may be implemented as part of an operating system of a client device configured to display text document 300, as part of a software application (e.g., web browser) executed by the client device, and/or as part of a server device configured to provide text document 300 to the client device, among other possibilities. For example, aspects of NLP module 302 and/or render module 304 may be stored in data storage 208, executed by processor 206, and/or displayed/interacted with by way of user interface 204.

Specifically, NLP module 302 may include first NLP model(s) 312 and second NLP model(s) 320. First NLP model(s) 312 may be configured to generate first mark-up(s) 314 of text document 300. In some implementations, first NLP model(s) 312 may be configured to generate first mark-up(s) 314 and/or second NLP model(s) 320 may be configured to generate second mark-up(s) 322 based on a user profile 306, which may be associated with a particular user for which first mark-up(s) 314 and/or second mark-up(s) 322 are being generated. User profile 306 may include mark-up interaction history 308 and predetermined preferences 310. Mark-up interaction history 308 may define the particular user's prior interactions with previously-generated mark-ups, and may be updated over time as the particular user interacts with various mark-ups generated for different text documents. Predetermined preferences 310 may include various settings selected by the particular user that define how NLP module 302 and/or render module 304 operate with respect to text documents being viewed by the particular user. For example, predetermined preferences 310 may indicate the types of mark-ups that the particular user would like to be provided with, the types of mark-ups that the user would prefer to be omitted, and/or the conditions under which these mark-ups are to be provided or omitted (e.g., provide mark-up for text longer than 200 words, and omit mark-up otherwise).

In some implementations, NLP module 302 may operate in stages. Specifically, text document 300 may first be processed by first NLP models(s) 312 to generate first mark-up(s) 314. Based on first mark-up(s) 314 and text document 300, render module 304 may be configured to generate and display rendering 316 of text document 300 and first mark-up(s) 314. Rendering 316 may include one or more screens, components, and/or other aspects of a graphical user interface configured to display text document 300 visually annotated according to first mark-up(s) 314. For example, first mark-up(s) 314 may be displayed adjacent to and/or overlaid on top of text document 300.

Rendering 316 may represent first mark-up(s) 314 in an interactive manner, such that aspects of first mark-up(s) 314 may be selected or otherwise interacted with by the user, thereby allowing the user to indicate interest in particular aspects of text document 300. For example, a particular portion of first mark-up(s) 314 may be selected and/or interacted with by hovering over the particular portion and/or clicking the particular portion (e.g., via a mouse), tapping on the particular portion (e.g., via a touch screen), gazing at the particular portion (e.g., via an eye tracking device), and/or using a spatial gesture to interact with the particular component (e.g., via a virtual and/or augmented reality device), among other possibilities. Thus, based on a user interaction with a user interface displaying rendering 316, render module 304 may be configured to generate a representation of user interaction 318 with first mark-up(s) 314. User interaction 318 may include, for example, a selection of the particular portion of first mark-up(s) 314, which may be associated with a particular portion of text document 300. For example, the particular portion of first mark-up(s) 314 may be generated based on, representative of, overlaid on top of, and/or otherwise linked to the particular portion of text document 300.

Based on user interaction 318, NLP module 302 may be configured to select at least one NLP model (referred to herein as a second NLP model) from second NLP model(s) 320 by which to further process text document 300. The second NLP model may process text document 300 and thereby generate second mark-up(s) 322. Specifically, the second NLP model may be configured to process at least the particular portion of text document 300 that is associated with the selected portion of first mark-up(s) 314. In some cases, depending on the second NLP model and/or the selected portion of first mark-up(s) 314, the entirety of text document 300 may be processed in order to identify aspects thereof that are associated with the selected portion of first mark-up(s) 314.

Based on and/or in response to reception of second mark-up(s) 322 from NLP module 302, render module 304 may be configured to display rendering 324 of text document 300 and second mark-up(s) 322. Renderings 316 and 324 may facilitate the user's navigation through and/or comprehension of aspects of text document 300 by providing visual representations of the outputs of first NLP model(s) 312 and second NLP model(s) 320, respectively. In some cases, render module 304 may also allow the user to interact with portions of second mark-up(s) 322 by way of rendering 324, which may allow the user to navigate through second mark-up(s) 322, return to first mark-up(s) 314, and/or cause further (e.g., different) second mark-up(s) 322 to be generated and/or displayed.

Accordingly, first NLP model(s) 312 may be viewed as providing a first level or stage of processing of text document 300 that is independent of user interactions, while second NLP model(s) 320 may be viewed as providing a second level or stage of processing of text document 300 that is based at least in part on one or more user interactions. Specifically, first NLP model(s) 312 may include a first plurality of NLP models each configured to process text document 300 in a different way and generate corresponding mark-up(s). Examples of possible types of NLP models are illustrated in and discussed with respect to FIG. 3B. Thus, first NLP model(s) 312 may be configured to generate a first plurality of different mark-ups that summarize, organize, annotate, and/or otherwise represent aspects of text document 300. In some cases, first NLP models 312 may provide a coarse, general, or otherwise high-level representation of aspects of text document 300. Thus, first NLP models 320 may be configured to process text document 300 as a whole, rather than focusing on subsets thereof.

First mark-up(s) 314 may, depending on user profile 306 and/or text document 300, include a subset of or the entirety of the first plurality of different mark-ups that could be generated by first NLP model(s) 312. For example, predetermined preferences 310 may indicate which mark-up(s) of the first plurality of different mark-ups are to be provided for text documents viewed by a particular user. Alternatively or additionally, NLP module 302 may be configured to classify text document 300 (e.g., based on a source, author, genre, length, and/or other attributes thereof) and, based on this classification, determine which mark-up(s) of the first plurality of different mark-ups are to be provided for text document 300.

Second NLP model(s) 320 may include a second plurality of NLP models each configured to process text document 300 in a different way and generate corresponding mark-up(s). Thus, second NLP model(s) 320 may be configured to generate a second plurality of different mark-ups that summarize, organize, annotate, and/or otherwise represent aspects of text document 300. In some cases, the second plurality of NLP models may provide a refined, detailed, or otherwise lower-level representation of aspects of text document 300. Thus, one or more second NLP models 320 may be configured to process subsets/portions of text document 300, rather than processing text document 300 as a whole.

Second mark-up(s) 322 may include a subset of the second plurality of different mark-ups, with the subset being determined based on user interaction 318. Specifically, each of first NLP model(s) 312 may be mapped to at least one NLP model of second NLP model(s) 320. Thus, user interaction 318 with a particular portion of first mark-up(s) 314 may indicate which one of second NLP model(s) 320 is to be used to perform further processing of text document 300. That is, user interaction 318 may be the basis for selecting the second NLP model from second NLP model(s) 320.

For example, first NLP model(s) 312 may include six different NLP models, each configured to generate a different type of mark-up. Accordingly, first mark-up(s) 314 may include six different types of mark-up, and each type of mark-up may be associated with one or more instances of that type of mark-up. When text document 300 is first shown to a user, the system might not be aware of how the user would like to consume and/or interact with the content of text document 300 and/or what the user's goal is in viewing text document 300. Thus, NLP module 302 may be configured to process text document 300 by each of the six different NLP models to generate the six different types of mark-up, which may be displayed by render module 304. By interacting with a particular instance (i.e., portion) of one of the six types of mark-up, the user may indicate how the user would like to consume the content of text document 300. Specifically, the interaction with the particular instance of one of the six types of mark-up may indicate the type of NLP processing or mark-up the user finds most helpful with respect to text document 300.

The division between first NLP model(s) 312 and second NLP model(s) 320 offers efficiencies in terms of computational processing, especially (but not necessarily) when text document 300 is very long, because first NLP model(s) 312 may operate at a general level of processing, whereas more detailed and specific processing might only be performed based on what and/or how the user subsequently wishes to navigate via a selected second NLP model.

Specifically, based on user interaction 318, NLP module 302 may be configured to select one or more of second NLP model(s) 320 by which to further process text document 300 to provide additional mark-up (i.e., second mark-up(s) 322) that the user is expected to find useful. Thus, rather than processing text document 300 with each of second NLP model(s) 320 before a user interacts with text document 300, a subset of second NLP model(s) 320 may be selected based on the user interaction. Since execution of some NLP models may be computationally-intensive and the user might not use some of the mark-ups generated thereby, processing text document 300 in stages reduces the amount of wasteful computation carried out by NLP module 302. The computational effort may instead be dedicated to, for example, executing the software application (e.g., web browser) by way of which text document 300 is being displayed, thus improving the user experience by reducing and/or avoiding apparent slow downs and/or loading times in the software application.

Further, by providing the mark-up in stages, the visual aesthetic of text document 300 may be less likely to be diminished by displaying a large and/or overwhelming amount of information to the user. For example, because first mark-up(s) 314 may provide a high-level representation of aspects of text document 300, first mark-up(s) 314 may be relatively sparse in comparison to the second plurality of different mark-ups that could be generated by second NLP model(s) 320. Thus, first mark-up(s) 314, when used to annotate text document 300, might not clutter or otherwise negatively affect the visual appeal of text document 300. Additionally, once a portion of first mark-up(s) 314 is selected, the non-selected aspects of first mark-up(s) 314 may be hidden, thus freeing up room for the display of second mark-up(s) 322. Since second mark-up(s) 322 represent a subset of, rather than the entirety of, the second plurality of different mark-ups that could be generated by second NLP model(s), rendering 324 may provide an amount of mark-up that further assists with navigation and/or comprehension of text document 300, without adversely affecting the visual appeal thereof.

Also, improved flexibility is provided because software updates which may relate to a particular NLP model, whether one or more of first NLP model(s) 312 and/or one or more of second NLP model(s) 320, may be made on a per-model basis, without having to update, for example, a global model and/or without having to take such a global model out of use for a period of time. Also, a malfunction or bug in a particular NLP model might not affect other components (e.g., other NLP models) of NLP module 302.

User interactions with a particular portion of first mark-up(s) 314 (e.g., user interaction 318) and/or user interactions with second mark-up(s) 322 may be stored as part of mark-up interaction history 308. Thus, these user interactions may be used to select NLP models that provide mark-ups that a user is likely to find useful (e.g., based on frequent interactions therewith), while omitting NLP models that provide mark-ups that a user is unlikely to find useful (e.g., based on rare and/or non-existent interactions therewith). In some implementations, a rule-based algorithm and/or a machine learning model may be configured to select, based on user profile 306, the subset of first NLP model(s) 312 used to generate first mark-up(s) 312 for a particular user.

Further, in some cases, user interactions with first mark-up(s) 314 and/or second mark-up(s) 322 may be used to define training data based on which first NLP model(s) 312 and/or second NLP model(s) 320 may be trained. Specifically, a user interaction may indicate that a particular mark-up is useful, correct, and/or otherwise desirable with respect to a particular type of text document and/or a user associated with a particular user profile. Similarly, an absence of a user interaction (e.g., over time) may indicate that a particular mark-up is not useful, not correct, and/or is not otherwise desirable with respect to the particular type of text document and/or the user associated with a particular user profile.

Thus, each of the generated mark-ups may be labeled based on whether it has been interacted with, thereby defining a "ground truth" data based on which the NLP models may be trained and/or retrained to provide outputs that more accurately represent the contents of text documents.

IV. EXAMPLE MAPPINGS OF NLP MODELS AND MARK-UPS

Figure 3B:
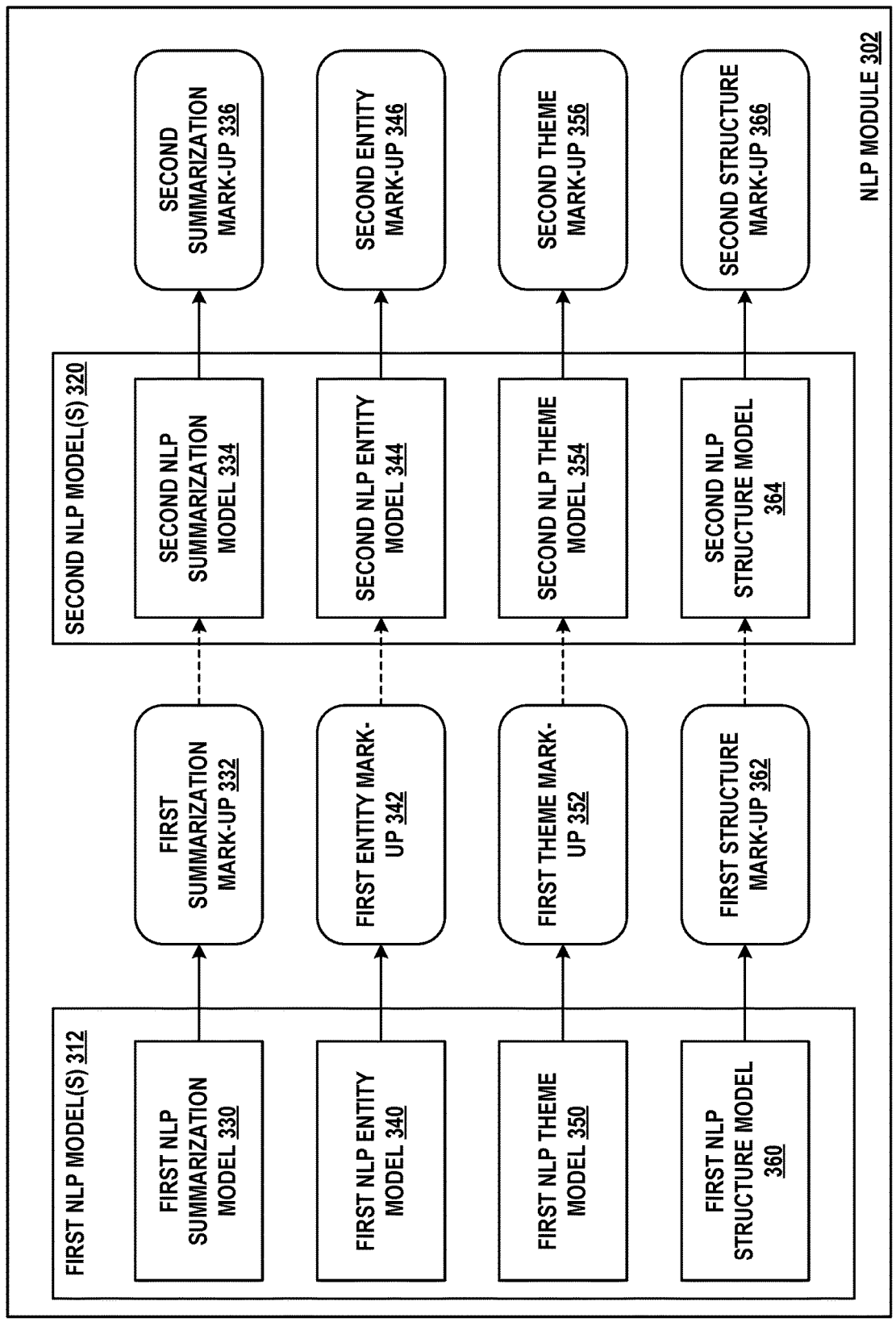
FIG. 3B illustrates a mapping between NLP models, in accordance with example embodiments.

FIG. 3B illustrates an example mapping between first NLP model(s) 312 and second NLP model(s) 320, as well as the different mark-ups that could be generated. For example, first NLP model(s) 312 may include four NLP models: first NLP summarization model 330, first NLP entity model 340, first NLP theme model 350, and first NLP structure model 360. Similarly, second NLP model(s) may include four corresponding NLP models: second NLP summarization model 334, second NLP entity model 344, second NLP theme model 354, and second NLP structure model 364. Each of these NLP models may include and/or be based on rule-based algorithms, statistical algorithms, and/or machine learning algorithms.

First NLP summarization model 330 may be configured to generate first summarization mark-up 332. When a portion of first summarization mark-up 332 is selected, at least a corresponding portion of text document 300 associated with the selected portion may be processed by second NLP summarization model 334, thus generating second summarization mark-up 336.

In a first example, first NLP summarization model 330 may be a summarization generation model (e.g., an abstractive summarization model or an extractive summarization model) configured to generate a plurality of sets of one or more words that provide summaries of respective portions of text document 300. For example, each set of one or more words may form a phrase or sentence that summarizes a respective portion (e.g., sentence, paragraph, or series of paragraphs that form a section) of text document 300 and/or a respective idea/concept described within text document 300. Second NLP summarization model 334 may be a summarization mapping model configured to identify the section of text document 300 summarized by a particular set of words.

Thus, the user may be provided with a plurality of phrases or sentences that summarize aspects of text document 300 and, based on the user selecting a particular phrase or sentence, the user may be provided with an indication of the portions of text document 300 that form the basis for the selected phrase or sentence. For example, the portions of text document 300 that form the basis for the selected phrase or sentence may be highlighted, indicated with a bounding box, shown in a different font and/or color, and/or otherwise visually set apart from other text. Accordingly, the user may be able to quickly skim summaries of portions of text document 300, select a particular summary, and thereby find within text document 300 the original text that addresses a particular concept, idea, and/or topic in which the user is interested.

Additionally or alternatively, in a second example, the plurality of sets of words generated by first NLP summarization model 330 may summarize text document 300 at a high level of generality and/or may summarize text document 300 as a whole (rather than summarizing only a section thereof). Summarization model 330 may thus be referred to as a coarse summarization (generation) model. Second NLP summarization model 334 may be a refined summarization (generation) model configured to generate one or more additional sets of one or more words that provide a summary of a particular portion of text document 300. In some cases, coarse summarization model and refined summarization model may be based on the same underlying algorithm or model, but may be scoped to process different portions of text document 300, process different amounts of text, and/or generate summaries of different lengths.

Thus, for example, the user may be provided with a plurality of phrases or sentences that summarize text document 300 as a whole. Based on selecting a particular phrase or sentence, the user may be provided with one or more additional phrases or sentences that provide additional detail regarding a portion (e.g., a section) of the document corresponding to the selected phrase or sentence. Accordingly, the user may be able to quickly navigate through summaries of text document 300 that provide varying levels of detail, such as by obtaining successively more detailed summaries of portions of text document 300.

First NLP entity model 340 may be configured to generate first entity mark-up 342. When a portion of first entity mark-up 342 is selected, at least a corresponding portion of text document 300 associated with the selected portion may be processed by second NLP entity model 344, thus generating second entity mark-up 346.

For example, first NLP entity model 340 may be a named entity recognition model configured to generate/identify a plurality of entities present within text document 300. For example, each entity of the plurality of entities may represent a person, an organization, a location, a time, a percentage, and/or a monetary value, among other possibilities. Second NLP entity model 344 may be a coreference resolution model configured to identify semantic relationships among the entities within text document 300. Specifically, the coreference resolution model may be configured to identify one or more entities that are semantically related to a particular entity.

Thus, for example, the user may be provided with a list of entities identified within text document 300 and, based on the user selecting a particular entity, the user may be provided with an indication of other entities in text document 300 that refer to and/or are otherwise related to the particular entity. Accordingly, the user may be able to quickly find within text document 300 the portions that refer to, and thus provide additional information regarding, the particular entity, thereby allowing the user to focus on reading portions of text document 300 relevant to the particular entity.

First NLP theme model 350 may be configured to generate first theme mark-up 352. When a portion of first theme mark-up 352 is selected, at least a corresponding portion of text document 300 associated with the selected portion may be processed by second NLP theme model 354, thus generating second theme mark-up 356.

In a first example, first NLP theme model 350 may be a coarse text classification model configured to generate a plurality of categories of text present within text document 300. Text classification models may include word, phrase, and/or sentence embedding algorithms, and/or algorithms configured to cluster the embeddings generated thereby. In some cases, the plurality of categories may include a plurality of topics mentioned, discussed, and/or otherwise included in text document 300. Example topics may include technology, politics, economics, history, entertainment, and/or subtopics thereof. In other cases, the coarse text classification model may be configured to determine the plurality of categories based on the topic and/or subtopics of text document 300. For example, text document 300 may be determined to be on the topic of the stock market, and the categories may thus include a bullish category, a bearish category, and a neutral category. In another example, text document 300 may be determined to be a product review, and the categories may thus include a positive sentiment category, a negative sentiment category, and a neutral sentiment category. Other topics and/or categories are possible.

The second NLP theme model 354 may be a refined text classification model configured to identify, within text document 300, one or more sentences that are associated with a particular category. Thus, for example, the user may be provided with a list of categories associated with text document 300 and, based on selecting a particular category, the user may be provided with an indication of the one or more sentences in text document 300 that belong to the particular category. For example, when text document 300 represents a product review and the user selects the positive sentiment category, sentences that discuss the pros (rather than, e.g., the cons) of a particular product may be visually indicated. Accordingly, the user may be able to quickly find within text document 300 portions thereof associated with a particular topic and/or viewpoint thereon.

In a second example, first NLP theme model 350 may be a text classification model configured to generate a plurality of entailment categories of text present within text document 300. The entailment categories may correspond to, for example, positions and/or viewpoints discussed within text document 300. Each entailment category may represent a particular hypothesis identified within and/or generated based on text document 300. In some cases, each of the categories generated by the coarse text classification model may constitute and/or be associated with a particular hypothesis.

The second NLP theme model 354 may be a textual entailment model configured to identify/determine an extent of textual entailment between a particular entailment category and portions of text document 300. The textual entailment model may be based on and/or include one or more natural language inference algorithms. The extent of textual entailment may be a quantitative measure indicating whether a portion of text document 300 entails the particular category (e.g., hypothesis), contradicts the particular category, or neither (e.g., is independent thereof). Thus, for example, the user may be provided with a list of entailment categories corresponding to various hypotheses set forth by text document 300 and, based on selecting a particular entailment category, the user may be provided with indications of whether each sentence in text document 300 supports, contradicts, and/or is independent of the particular entailment category. Accordingly, the user may be able to quickly find within text document 300 portions thereof that support, contradict, and/or are independent of various positions and/or viewpoints on one or more topics.

First NLP structure model 360 may be configured to generate first structure mark-up 362. When a portion of first structure mark-up 362 is selected, at least a corresponding portion of text document 300 associated with the selected portion may be processed by second NLP structure model 364, thus generating second structure mark-up 366.

For example, first NLP structure model 360 may be a document structure parsing model configured to generate a tree structure representing a hierarchy of paragraphs present within text document 300. For example, the tree structure may include one or more heading nodes corresponding to predefined sections (e.g., delineated by headings or other structural features of the document which may be determined automatically, for example by identifying one or more of underlining, font sizes, font styles, and/or line spacings) of text document 300. In some cases, the tree structure may also include, depending from each respective heading node, one or more paragraph nodes corresponding to respective paragraphs included under the respective heading. Second NLP structure model 364 may be an argument mining model configured to generate a representation of an argument structure of a particular paragraph or series of paragraphs. The argument structure may be represented as, for example, one or more sub-nodes depending from the node representing the particular paragraph and/or depending from the respective heading under which the particular paragraph is provided. Each of these sub-nodes may represent a particular phrase and/or sentence, and may be labeled according to the part of the argument represented by the particular phrase and/or sentence. For example, the sub-nodes may be labeled as "claim," "reason," "evidence," "warrant," and/or "counterclaim," among others.

Thus, for example, the user may be provided with a visual representation of a hierarchy identified within text document 300 and, based on selecting a particular node (corresponding to, e.g., a heading and/or a paragraph) within this hierarchy, the user may be provided with a further visual representation of the argumentative structure associated with the particular node. Accordingly, the user may be able to quickly determine the overall structure of text document 300, identify the arguments presented by different sections thereof, and/or determine the logical organization of the arguments.

V. EXAMPLE NLP-BASED MARK-UPS OF TEXT DOCUMENTS

FIG. 4 illustrates example mark-up generated by NLP summarization models (e.g., NLP summarization models 330 and 334). Specifically, FIG. 4 illustrates a graphical user interface (GUI) 400 displaying a text document 404, a summarization mark-up 402, and a summarization mark-up 408. Specifically, text document 404 may be processed by a summarization generation model to generate summarization mark-up 402, which includes three sentences each summarizing a different portion of text document 404. In particular, the first sentence of summarization mark-up 402 corresponds to the first paragraph of text document 404, the second sentence of summarization mark-up 402 corresponds to the second paragraph of text document 404, and the third sentence of summarization mark-up 402 corresponds to the third and fourth paragraphs of text document 404.

In some implementations, this processing of text document 404 may take place before text document 404 is displayed by way of GUI 400 and/or without an explicit user request for the mark-up generated by this processing. Thus, in response to a request to display text document 404, GUI 400 may display both text document 404 and summarization mark-up 402. That is, summarization mark-up 402 may be provided automatically, based on the request to display text document 404 and without dependence on additional requests to generate/display summarization mark-up 402.

Summarization mark-up 408, on the other hand, might not be generated until a user selects a corresponding sentence from summarization mark-up 402, as indicated by block/selection 406. Specifically, selection 406 of the second sentence from summarization mark-up 402 may cause a summarization mapping model to identify the portions of text document 404 (i.e., the second paragraph thereof) summarized by the second sentence, and a visual identification of the portions may be displayed via GUI 400. Similarly, selection of a different sentence (e.g., the third sentence) from summarization mark-up 402 may again cause the summarization mapping model to identify further portions of text document 404 (e.g., the third and fourth paragraphs thereof) summarized by the different sentence, and a visual identification of the further portions may be displayed via GUI 400. In some implementations, where the portions of text document 404 are not initially presented by GUI 400 (e.g., if the second paragraph thereof is not currently visible and relates to a later, off-screen, part of the text document) the visual identification of the portions may involve jumping/moving to said off-screen portion.

Summarization mark-up 402 shown in FIG. 4 may be based on the output of an extractive summarization generation model configured to select one or more words (e.g., individual words, phrases, and/or sentences) from a portion of text document 404 to act as the summary thereof. For clarity of illustration, summarization mark-up 402 includes complete sentences taken from text document 404. In other implementations, summarization mark-up 402 may be based on the output of an abstractive summarization generation model, and may thus include words, phrases, and/or sentences that do not explicitly appear in text document 404. Thus, the specific implementation of the summarization mapping model may depend at least in part on whether the selected portion of summarization mark-up 402 was generated by an extractive or an abstractive summarization generation model.

In other implementations, selection of the second sentence from summarization mark-up 402 may instead cause a refined summarization model to process the second paragraph of text document 404 and generate one or more additional words summarizing the second paragraph at a higher level of detail. Thus, rather than visually indicating the second paragraph by way of mark-up 408, the one or more additional words (not shown) may be displayed by way of GUI 400 (e.g., between the first and second paragraph in text document 404, adjacent to the second paragraph, or in another region/component of GUI 400).

FIG. 5 illustrates example mark-up generated by NLP entity models (e.g., NLP entity models 340 and 344). Specifically, FIG. 5 illustrates GUI 500 configured to display therein text document 504, entity mark-up 502, and entity mark-up 508. Specifically, text document 504 may be processed by a named entity recognition model to generate entity mark-up 502, which includes four entities mentioned within text document 504. In particular, the four entities include "Meowbank," "Edison Motors Inc.," "FTA" (i.e., Federal Transportation Administration), and "Senate Commerce Committee." In other implementations, rather than being provided as a side-panel, entity mark-up 502 may instead be provided in-line with text document 504 by, for example, highlighting each entity directly within text document 504 in a manner similar to that used for entity mark-up 508.

In some implementations, this processing of text document 504 may take place before text document 504 is displayed by way of GUI 500 and/or without an explicit user request for the mark-up generated by this processing. Thus, entity mark-up 502 may be provided automatically, based on the request to display text document 504 and without dependence on additional requests to generate/display entity mark-up 502. Entity mark-up 508, on the other hand, might not be generated until a user selects a corresponding entity from entity mark-up 502, as indicated by block/selection 506.

Specifically, selection 506 of the "Meowbank" entity from entity mark-up 502 may cause a coreference resolution model to identify the entities in text document 504 that are semantically related to "Meowbank" (e.g., refer to the same entity, define attributes of the entity, etc.), and a visual identification of the semantically related entities may be displayed via GUI 500. Thus, selection of "Meowbank" may cause "a company representative," "Kristen Meowbank," "a vehicle engineer," and "she" to be highlighted in text document 504, as collectively indicated by entity mark-up 508. Similarly, selection of a different entity (e.g., Edison Motors Inc.) from entity mark-up 502 may again cause the coreference resolution model to identify additional entities in text document 504 that are semantically related to the different entity (e.g., "Edison" in the third paragraph), and a visual identification of the additional entities may be displayed via GUI 500.

FIG. 6 illustrates example mark-up generated by NLP theme models (e.g., NLP theme models 350 and 354). Specifically, FIG. 6 illustrates GUI 600 configured to display therein text document 604, theme mark-up 602, and theme mark-up 608. Specifically, text document 604 may be processed by a text classification model to generate theme mark-up 602, which includes bullish outlook/category 610, neutral outlook/category 612, and bearish outlook/category 614.

Depending on the content of text document 604 and/or the type of text classification model used, theme mark-up 602 may include a plurality of different categories. In the example shown in FIG. 6, since text document 604 discusses the stock market, the theme mark-up 602 includes the bullish, neutral, and bearish categories 610, 612, and 614, respectively. In another example, the text document may be a product review, and the theme mark-up may thus include a "positive" category, a "neutral" category, and a "negative" category. In a further example, the text document may be an essay advocating a particular position, and the theme mark-up may thus include an "agree" category, an "indifferent" category, and a "disagree" category. In some cases, each category may, additionally or alternatively, be a textual entailment category that represents, for example, a respective hypothesis that may entail, contradict, or be neutral with respect to statements within text document 604.

In some implementations, this processing of text document 604 may take place before text document 604 is displayed by way of GUI 600 and/or without an explicit user request for the mark-up generated by this processing. Thus, theme mark-up 602 may be provided automatically, based on the request to display text document 604 and without dependence on additional requests to generate/display theme mark-up 602. Theme mark-up 608, on the other hand, might not be generated until a user selects a corresponding theme from theme mark-up 602.

For example, selection of bearish outlook 614, as indicated by the patterned fill thereof, from theme mark-up 602 may cause a second text classification model to identify sentences in text document 604 that are associated with the category, and a visual identification of the extent of this association may be displayed via GUI 600. For example, the second text classification model may be a refined text classification model configured to identify sentences that belong to the selected category, and/or determine how closely each sentence relates to the selected category. Thus, selection of bearish outlook 614 may cause the first, fourth, fifth, and sixth sentences to be visually indicated in text document 604, as collectively indicated by theme mark-up 608.

Further, the extent, or strength, of the association between bearish category 614 and each "bearish" sentence may be visually indicated by highlighting each "bearish" sentence with different colors or patterns. Thus, the first and fourth sentences are indicated via a highly-darkened pattern to indicate a strong association (i.e., a very bearish sentence), the fifth sentence is indicated via a moderately-darkened pattern to indicate a moderate association (i.e., a moderately-bearish sentence), and the sixth sentence is indicated via a slightly-darkened pattern to indicate a weak association (i.e., a slightly bearish sentence). In some cases, selection of bearish outlook 614 may additionally or alternatively cause sentences other than the first, fourth, fifth, and sixth sentences may be hidden and/or made less visually apparent.

Similarly, selection of a different category (e.g., bullish outlook 610) from theme mark-up 602 may cause the refined classification model to identify sentences in text document 604 that express a bullish sentiment (e.g., the second and third sentences in text document 604) and determine the extent to which each sentence is bullish. A visual identification of these bullish sentences, and the extent of the bullish sentiment, may be displayed visual indications of these sentences within GUI 600.

In implementations where each category represents a textual entailment hypothesis, a textual entailment model may be configured to determine an extent of textual entailment between the selected category and each sentence within text document 604. Thus, for example, bearish outlook 614 may be associated with the hypothesis "the stock market will lose value," and the textual entailment model may be configured to determine whether each sentence entails this hypothesis, contradicts this hypothesis, or is neutral with respect to the hypothesis. The degree to which the hypothesis is entailed, contradicted, or neutral with respect to each sentence may be visually indicated by way of GUI 600 in a manner similar to that shown in FIG. 6.

Figure 7B:
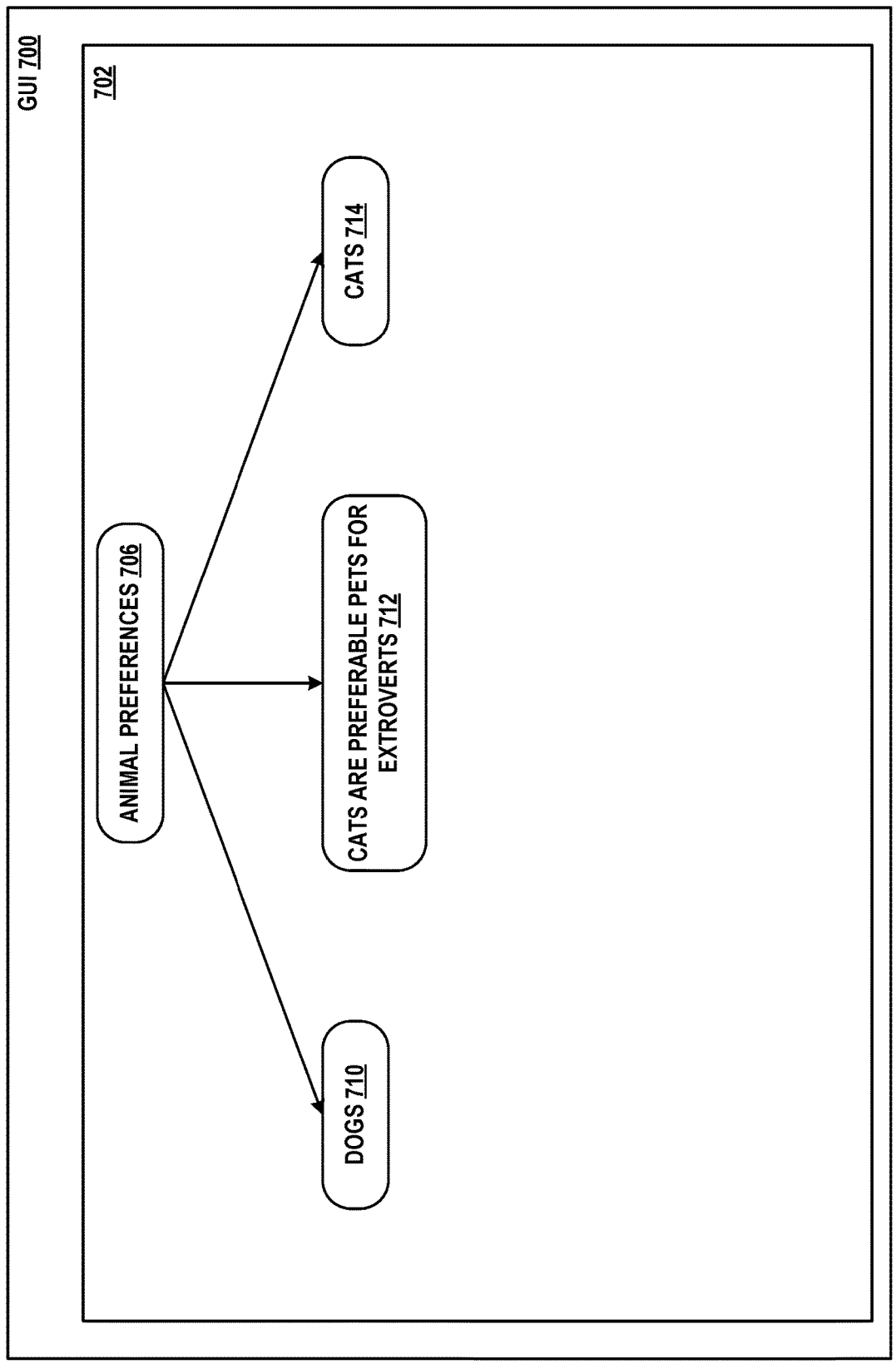
Figure 7C:
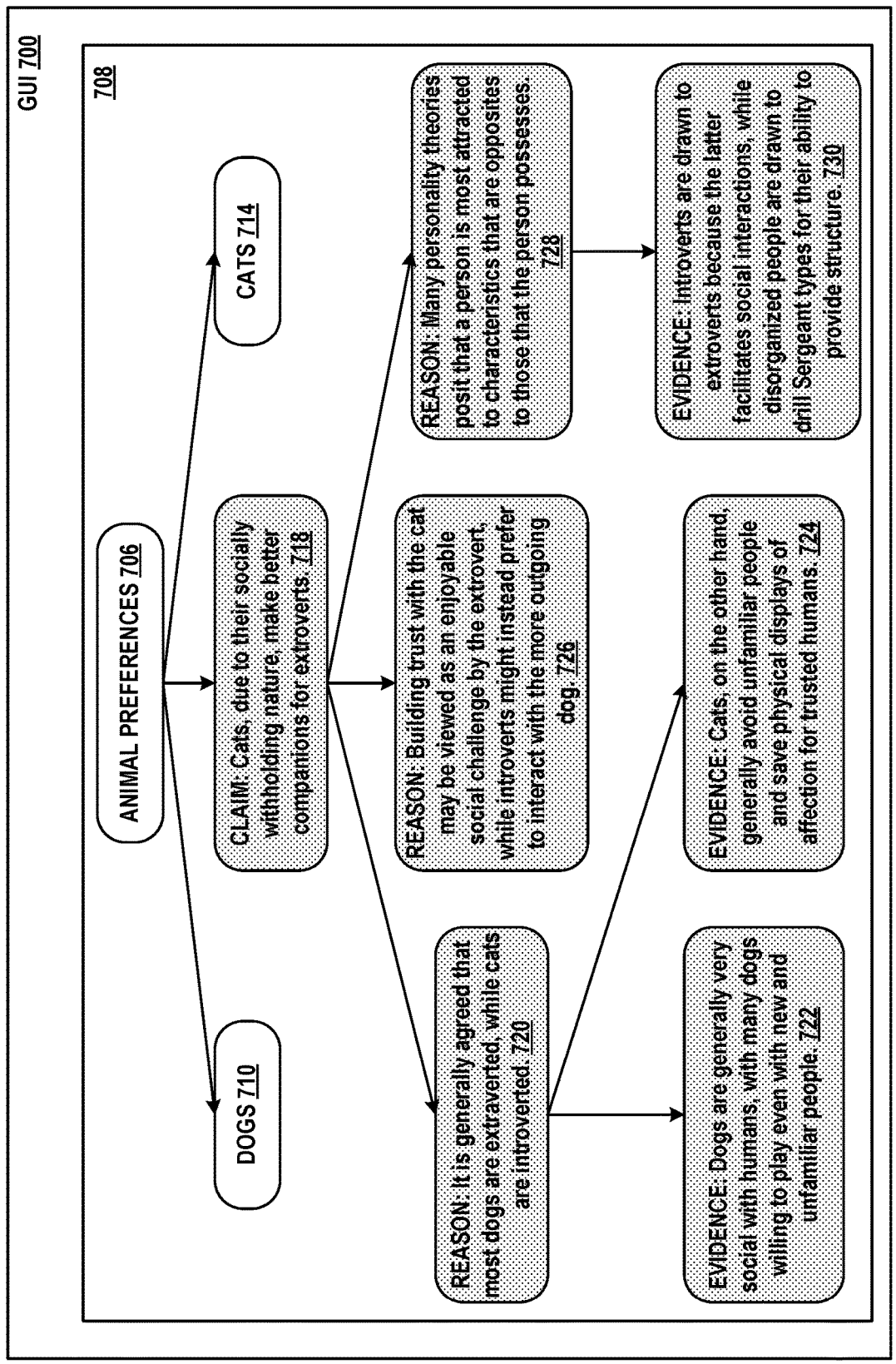

FIGS. 7A, 7B, and 7C illustrate example mark-up generated by NLP structure models (e.g., NLP structure models 360 and 364). Specifically, FIGS. 7A, 7B, and 7C illustrate GUI 700 configured to display therein text document 704, structure mark-up 702, and structure mark-up 708, each of which are shown as part of a different figure for clarity of illustration. In practice, structure mark-up 702 and/or 708 may be displayed above, below, to the side of, and/or overlaid on top of text document 704.

Text document 704 may be processed by a document structure parsing model to generate structure mark-up 702, which is organized into a tree structure that includes four nodes. The four nodes represent the hierarchy of paragraphs present within text document 704. In particular, the four nodes include "Animal Preferences" node 706 corresponding to the main title of text document 704, and, depending therefrom, "Dogs" node 710 corresponding to the first heading and paragraph of text document 704, "Cats" node 714 corresponding to the second heading and paragraph of text document 704, and "Cats are Preferable Pets for Extroverts" node 712 corresponding to the third heading and paragraph of text document 704. In cases where a heading contains more than one paragraph, the heading may be represented by one node, and the paragraphs therein may be represented by multiple nodes depending therefrom, or the paragraphs and the heading may be collectively represented by a single node.

In some implementations, the processing of text document 704 to generate mark-up 702 may take place before text document 704 is displayed by way of GUI 700 and/or without an explicit user request for mark-up 702. Thus, structure mark-up 702 may be provided automatically, based on the request to display text document 704 and without dependence on additional requests to generate/display structure mark-up 702. Structure mark-up 708, on the other hand, might not be generated until a user selects a corresponding node from structure mark-up 702.

For example, selection of node 712 from structure mark-up 702 may cause an argument mining model to generate a representation of an argument structure of the paragraphs associated with node 712. The argument structure may be represented by additional nodes, each of which may indicate the role of a corresponding sentence within the argument presented by the paragraphs associated with the selected node (e.g., node 712). A visual representation of these additional nodes may be displayed via GUI 700.

Thus, selection of node 712 may cause nodes 718, 720, 722, 724, 726, 728, and 730 (i.e., argument structure nodes 718-730) to be displayed by way of GUI 700 as part of structure mark-up 708. Specifically, node 718 may indicate that the sixth sentence of the third paragraph of text document 704 represents a claim of the argument, node 720 may indicate that the first sentence of the third paragraph of text document 704 represents a reason supporting the claim of node 718, and nodes 722 and 724 may indicate that the second and third sentences, respectively, of the third paragraph of text document 704 represent evidence supporting the reason of node 720. Similarly, node 726 may indicate that the seventh sentence of the third paragraph of text document 704 represents a reason supporting the claim of node 718, and this reason is not supported by any evidence. Further, node 728 may indicate that the fourth sentence of the third paragraph of text document 704 represents a reason supporting the claim of node 718, and node 730 may indicate that the fifth sentence of the third paragraph of text document 704 represents evidence supporting the reason of node 728.

Similarly, selection of a different node (e.g., node 710) from structure mark-up 702 may cause the argument mining model to generate additional argument structure nodes representing the argument structure (if any) of the corresponding paragraphs in text document 704. The additional argument structure nodes may be displayed via GUI 700. In some cases, the previously-displayed argument structure nodes 718-730 may be hidden or otherwise removed from GUI 700 to make room for the additional argument structure nodes.

In some implementations, two or more of the summarization, entity, theme, and/or structure mark-ups, as exemplified by mark-ups 402, 502, 602, and 702, respectively, may be provided as part of the initial rendering of a particular text document. Based on selection of a portion of a particular one of these mark-ups, the mark-ups that have not been selected may be hidden, and an additional mark-up (e.g., mark-up 408, 508, 608, or 708) corresponding to the selected mark-up may be provided. Thus, a text document may initially be marked-up with a plurality of different types of first mark-ups. Once a user interacts with one of the first mark-ups, the second mark-up generated in response to this interaction may be of the same type as the mark-up the user interacted with. The user may be able to return to viewing the plurality of different types of mark-up, select a different one of the first mark-ups.

VI. ADDITIONAL EXAMPLE OPERATIONS

Figure 8:
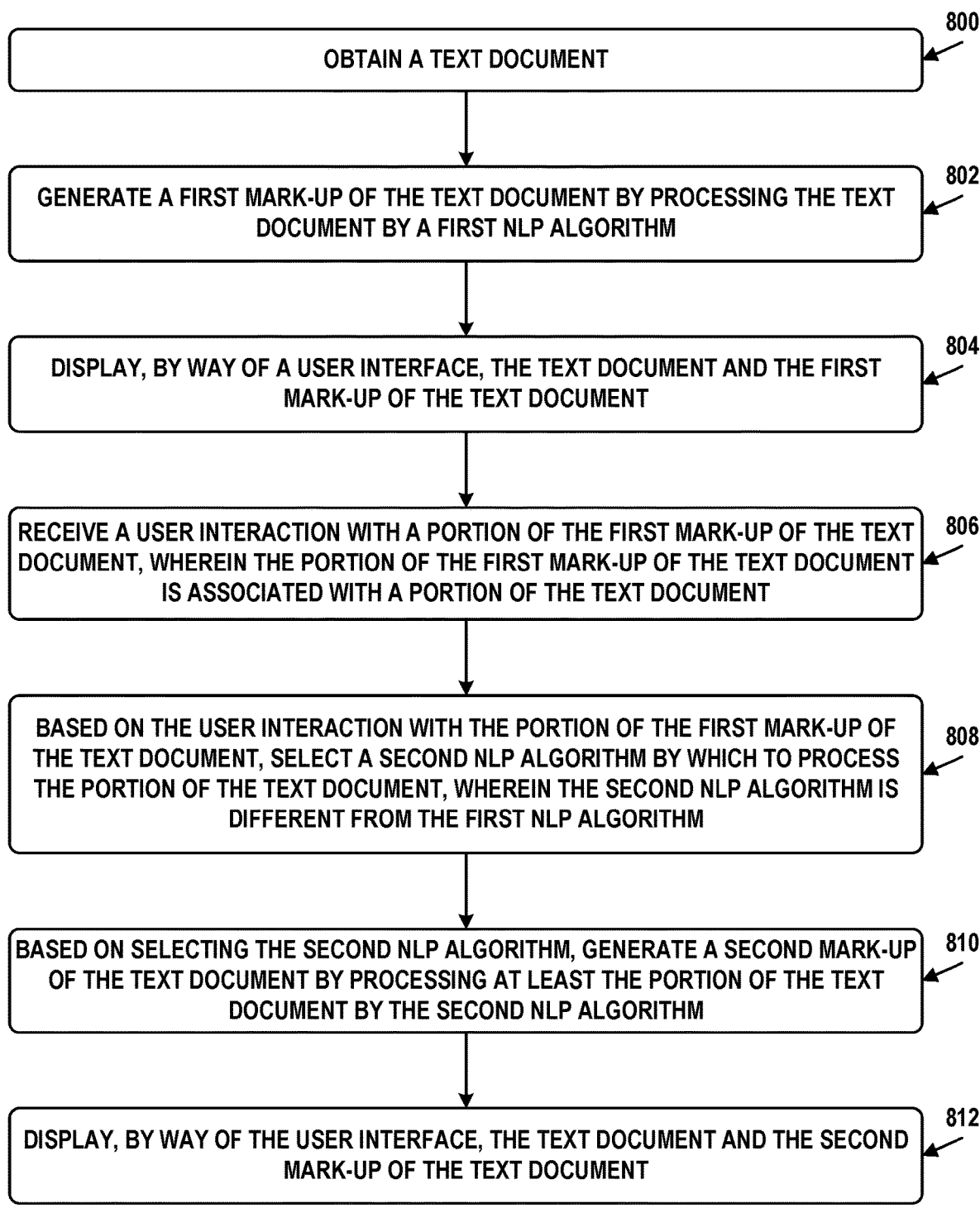
FIG. 8 illustrates a flow chart, in accordance with example embodiments.

FIG. 8 illustrates a flow chart of operations related to determining mark-ups for facilitating the navigation and comprehension of a text document. The operations may be carried out by computing device 100, computing system 200, NLP module 302, render module 304, an operating system of a computing device, a web browser application, and/or a server device, among other possibilities. The embodiments of FIG. 8 may be simplified by the removal of any one or more of the features shown therein. Further, these embodiments may be combined with features, aspects, and/or implementations of any of the previous figures or otherwise described herein.

Block 800 may involve obtaining a text document.

Block 802 may involve generating a first mark-up of the text document by processing the text document by a first NLP model.

Block 804 may involve displaying, by way of a user interface, the text document and the first mark-up of the text document.

Block 806 may involve receiving a user interaction with a portion of the first mark-up of the text document. The portion of the first mark-up of the text document may be associated with a portion of the text document.

Block 808 may involve, based on the user interaction with the portion of the first mark-up of the text document, selecting a second NLP model by which to process the portion of the text document. The second NLP model may be different from the first NLP model.

Block 810 may involve, based on selecting the second NLP model, generating a second mark-up of the text document by processing at least the portion of the text document by the second NLP model.

Block 812 may involve displaying, by way of the user interface, the text document and the second mark-up of the text document.

In some embodiments, generating the first mark-up of the text document may include generating a first plurality of mark-ups of the text document by processing the text document by a first plurality of NLP models. The first plurality of NLP models may include the first NLP model. The first plurality of mark-ups may include the first mark-up. Displaying the text document and the first mark-up of the text document may include displaying the text document and the first plurality of mark-ups of the text document. Receiving the user interaction with the portion of the first mark-up of the text document may include receiving a selection of the portion of the first mark-up from the first plurality of mark-ups. Selecting the second NLP model may include selecting the second NLP model from a second plurality of NLP models based on the selection of the portion of the first mark-up from the first plurality of mark-ups. Each respective NLP model of the second plurality of NLP models may be associated with a corresponding mark-up of the first plurality of mark-ups.

In some embodiments, the first NLP model may include a summarization generation model. The second NLP model may include a summarization mapping model. Generating the first mark-up of the text document may include generating, by the summarization generation model, a plurality of sets of one or more words that provide a summary of respective portions of the text document. The user interaction with the portion of the first mark-up of the text document may include a selection of a particular set of the plurality of sets. Generating the second mark-up of the text document may include identifying, by the summarization mapping model, the portion of the text document summarized by the particular set. Displaying the text document and the second mark-up of the text document may include displaying, within the text document, a visual indication of the portion of the text document summarized by the particular set.

In some embodiments, the first NLP model may include a coarse summarization model. The second NLP model may include a refined summarization model. Generating the first mark-up of the text document may include generating, by the coarse summarization model, a plurality of sets of one or more words that provide a summary of respective portions of the text document. The user interaction with the portion of the first mark-up of the text document may include a selection of a particular set of the plurality of sets. The particular set may provide a summary of the portion of the text document. Generating the second mark-up of the text document may include generating, by the refined summarization model, one or more additional sets of one or more words that provide a summary of respective subsection of the portion of the text document. Displaying the text document and the second mark-up of the text document may include displaying the one or more additional sets.

In some embodiments, the first NLP model may include a named entity recognition model. The second NLP model may include a coreference resolution model. Generating the first mark-up of the text document may include generating, by the named entity recognition model, a plurality of entities present within the text document. The user interaction with the portion of the first mark-up of the text document may include a selection of a particular entity of the plurality of entities. Generating the second mark-up of the text document may include identifying, by the coreference resolution model, one or more additional entities in the text document that are semantically related to the particular entity. The portion of the text document may include the one or more additional entities. Displaying the text document and the second mark-up of the text document may include displaying, within the text document, a visual indication of the particular entity and the one or more additional entities.

In some embodiments, the first NLP model may include a coarse text classification model. The second NLP model may include a refined text classification model. Generating the first mark-up of the text document may include generating, by the coarse text classification model, a plurality of categories of text present within the text document. The user interaction with the portion of the first mark-up of the text document may include a selection of a particular category of the plurality of categories of text. Generating the second mark-up of the text document may include identifying, by the refined text classification model, one or more sentences within the text document associated with the particular category. The portion of the text document may include the one or more sentences. Displaying the text document and the second mark-up of the text document may include displaying, within the text document, a visual indication of the one or more sentences.

In some embodiments, the first NLP model may include a text classification model. The second NLP model may include a textual entailment model. Generating the first mark-up of the text document may include generating, by the text classification model, a plurality of entailment categories of text present within the text document. The user interaction with the portion of the first mark-up of the text document may include a selection of a particular entailment category of the plurality of entailment categories. Generating the second mark-up of the text document may include identifying, by the textual entailment model, an extent of textual entailment between the particular entailment category and one or more sentences in the text document. The portion of the text document may include the one or more sentences. Displaying the text document and the second mark-up of the text document may include displaying, within the text document, a visual indication of the extent of textual entailment.

In some embodiments, the first NLP model may include a document structure parsing model. The second NLP model may include an argument mining model. Generating the first mark-up of the text document may include generating, by the document structure parsing model, a tree structure representing a hierarchy of paragraphs present within the text document. The user interaction with the portion of the first mark-up of the text document may include a selection, from the tree structure, of a particular node representing a corresponding paragraph. Generating the second mark-up of the text document may include generating, by the argument mining model, a representation of an argument structure of the corresponding paragraph. The portion of the document may include the corresponding paragraph. Displaying the text document and the second mark-up of the text document may include displaying a visual representation of the argument structure of the corresponding paragraph as part of the tree structure.

In some embodiments, displaying the text document and the first mark-up of the text document may include displaying the first mark-up above the text document such that the first mark-up precedes the text document within the user interface.

In some embodiments, displaying the text document and the second mark-up of the text document may include displaying the second mark-up overlaid on top of the text document such that the second mark-up appears integrated with the text document within the user interface.

In some embodiments, the first mark-up may be generated prior to and independently of user interactions with the text document.

In some embodiments, training data for at least one of the first NLP model or the second NLP model may be generated based on one or more of (i) the user interaction with the portion of the first mark-up of the text document or (ii) a user interaction with the second mark-up of the text document. The at least one of the first NLP model or the second NLP model may be updated through training based on the training data.

In some embodiments, a user profile may be updated based on one or more of: (i) the user interaction with the portion of the first mark-up of the text document or (ii) a user interaction with the second mark-up of the text document. The first NLP model may be further configured to generate the first mark-up based on the user profile or the second NLP model may be further configured to generate the second mark-up based on the user profile.

In some embodiments, the first NLP model may be selected based on a user profile that comprises at least one of: (i) user preferences associated with displaying text documents or (ii) a user interaction history with prior mark-ups of prior text documents.

In some embodiments, a classification of the text document may be determined, and the first NLP model may be selected based on the classification of the text document.

In some embodiments, the generation of the first mark-up of the text document, the selection of the second NLP model, and the generation of the second mark-up of the text document may each be performed by an operating system of a computing device, and the user interface may be provided by the computing device.

In some embodiments, the generation of the first mark-up of the text document, the selection of the second NLP model, and the generation of the second mark-up of the text document may each be performed by a server device communicatively connected to a computing device by which the user interface is provided.

In some embodiments, the generation of the first mark-up of the text document, the selection of the second NLP model, and the generation of the second mark-up of the text document may each be performed by a web browser application configured to be executed by a computing device, and the user interface may be provided by the web browser application.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
obtaining a text document;
generating a first plurality of mark-ups of the text document by processing the text document by a first plurality of natural language processing (NLP) models, wherein the first plurality of mark-ups comprises a first mark-up of the text document generated by a first NLP model of the first plurality of NLP models, wherein the first plurality of NLP models comprises a plurality of different types of NLP models configured to generate a plurality of different types of mark-ups each of which provides a corresponding coarse representation of the text document, wherein the first plurality of mark-ups comprises the plurality of different types of mark-ups;
displaying, by way of a user interface, the text document and the first plurality of mark-ups of the text document;
receiving a user selection of a portion of the first mark-up of the text document from the first plurality of mark-ups, wherein the portion of the first mark-up of the text document is associated with a portion of the text document;
in response to the user selection of the portion of the first mark-up of the text document, selecting, from a second plurality of NLP models and using a mapping, a second NLP model by which to process the portion of the text document, wherein the second NLP model is different from the first NLP model, wherein the mapping associates each respective NLP model of the second plurality of NLP models with a corresponding mark-up of the first plurality of mark-ups, wherein each respective NLP model of the second plurality of NLP models is configured to generate a corresponding refined representation of the portion of the text document, and wherein the second NLP model is associated with the first mark-up of the text document;

based on selecting the second NLP model, generating a second mark-up of the text document by processing at least the portion of the text document by the second NLP model, wherein the second mark-up provides the corresponding refined representation of the portion of the text document; and displaying, by way of the user interface, the text document and the second mark-up of the text document.

2. The computer-implemented method of claim 1, wherein:

the first NLP model comprises a summarization generation model, the second NLP model comprises a summarization mapping model, generating the first plurality of mark-ups of the text document comprises generating, by the summarization generation model, a plurality of sets of one or more words that provide a summary of respective portions of the text document, the user selection of the portion of the first mark-up of the text document comprises a selection of a particular set of the plurality of sets, generating the second mark-up of the text document comprises identifying, by the summarization mapping model, the portion of the text document summarized by the particular set, and displaying the text document and the second mark-up of the text document comprises displaying, within the text document, a visual indication of the portion of the text document summarized by the particular set.

3. The computer-implemented method of claim 1, wherein:

the first NLP model comprises a coarse summarization model, the second NLP model comprises a refined summarization model, generating the first plurality of mark-ups of the text document comprises generating, by the coarse summarization model, a plurality of sets of one or more words that provide a summary of respective portions of the text document, the user selection of the portion of the first mark-up of the text document comprises a selection of a particular set of the plurality of sets, the particular set provides a summary of the portion of the text document, generating the second mark-up of the text document comprises generating, by the refined summarization model, one or more additional sets of one or more words that provide a summary of respective subsection of the portion of the text document, and displaying the text document and the second mark-up of the text document comprises displaying the one or more additional sets.

4. The computer-implemented method of claim 1, wherein:

the first NLP model comprises a named entity recognition model, the second NLP model comprises a coreference resolution model, generating the first plurality of mark-ups of the text document comprises generating, by the named entity recognition model, a plurality of entities present within the text document, the user selection of the portion of the first mark-up of the text document comprises a selection of a particular entity of the plurality of entities, generating the second mark-up of the text document comprises identifying, by the coreference resolution model, one or more additional entities in the text document that are semantically related to the particular entity, the portion of the text document comprises the one or more additional entities, and displaying the text document and the second mark-up of the text document comprises displaying, within the text document, a visual indication of the particular entity and the one or more additional entities.

5. The computer-implemented method of claim 1, wherein:

the first NLP model comprises a coarse text classification model, the second NLP model comprises a refined text classification model, generating the first plurality of mark-ups of the text document comprises generating, by the coarse text classification model, a plurality of categories of text present within the text document, the user selection of the portion of the first mark-up of the text document comprises a selection of a particular category of the plurality of categories of text, generating the second mark-up of the text document comprises identifying, by the refined text classification model, one or more sentences within the text document associated with the particular category, the portion of the text document comprises the one or more sentences, and displaying the text document and the second mark-up of the text document comprises displaying, within the text document, a visual indication of the one or more sentences.

6. The computer-implemented method of claim 1, wherein:

the first NLP model comprises a text classification model, the second NLP model comprises a textual entailment model, generating the first plurality of mark-ups of the text document comprises generating, by the text classification model, a plurality of entailment categories of text present within the text document, the user selection of the portion of the first mark-up of the text document comprises a selection of a particular entailment category of the plurality of entailment categories, generating the second mark-up of the text document comprises identifying, by the textual entailment model, an extent of textual entailment between the particular entailment category and one or more sentences in the text document, the portion of the text document comprises the one or more sentences, and displaying the text document and the second mark-up of the text document comprises displaying, within the text document, a visual indication of the extent of textual entailment.

7. The computer-implemented method of claim 1, wherein:

the first NLP model comprises a document structure parsing model, the second NLP model comprises an argument mining model, generating the first plurality of mark-ups of the text document comprises generating, by the document structure parsing model, a tree structure representing a hierarchy of paragraphs present within the text document, the user selection of the portion of the first mark-up of the text document comprises a selection, from the tree structure, of a particular node representing a corresponding paragraph, generating the second mark-up of the text document comprises generating, by the argument mining model, a representation of an argument structure of the corresponding paragraph, the portion of the document comprises the corresponding paragraph, and displaying the text document and the second mark-up of the text document comprises displaying a visual representation of the argument structure of the corresponding paragraph as part of the tree structure.

8. The computer-implemented method of claim 1, wherein displaying the text document and the first plurality of mark-ups of the text document comprises one or more of:

displaying the first mark-up above the text document such that the first mark-up precedes the text document within the user interface; or displaying the first mark-up overlaid on top of the text document such that the first mark-up appears integrated with the text document within the user interface.

9. The computer-implemented method of claim 1, wherein the first mark-up is generated prior to and independently of user interactions with the text document.

10. The computer-implemented method of claim 1, further comprising:

generating training data for at least one of the first NLP model or the second NLP model based on one or more of (i) the user selection of the portion of the first mark-up of the text document or (ii) a user interaction with the second mark-up of the text document; and updating the at least one of the first NLP model or the second NLP model through training based on the training data.

11. The computer-implemented method of claim 1, further comprising:

updating a user profile based on one or more of: (i) the user selection of the portion of the first mark-up of the text document or (ii) a user selection of a portion of the second mark-up of the text document, wherein at least one of the first NLP model is further configured to generate the first mark-up based on the user profile or the second NLP model is further configured to generate the second mark-up based on the user profile.

12. The computer-implemented method of claim 1, further comprising:

selecting the first NLP model based on a user profile that comprises at least one of: (i) user preferences associated with displaying text documents or (ii) a user interaction history with prior mark-ups of prior text documents.

13. The computer-implemented method of claim 1, further comprising:

determining a classification of the text document; and selecting the first NLP model based on the classification of the text document.

14. The computer-implemented method of claim 1, wherein the generation of the first plurality of mark-ups of the text document, the selection of the second NLP model, and the generation of the second mark-up of the text document are each performed by an operating system of a computing device, and wherein the user interface is provided by the computing device.

15. The computer-implemented method of claim 1, wherein the generation of the first plurality of mark-ups of the text document, the selection of the second NLP model, and the generation of the second mark-up of the text document are each performed by a server device communicatively connected to a computing device by which the user interface is provided.

16. The computer-implemented method of claim 1, wherein the generation of the first plurality of mark-ups of the text document, the selection of the second NLP model, and the generation of the second mark-up of the text document are each performed by a web browser application configured to be executed by a computing device, and wherein the user interface is provided by the web browser application.

17. The computer-implemented method of claim 1, wherein each of the first plurality of mark-ups comprises a coarse visual representation of content present in the text document, and wherein the second mark-up comprises a refined visual representation of content present in the portion of the text document.

18. A system comprising:

a processor; and a non-transitory computer-readable medium having stored thereon instructions that, when executed by the processor, cause the processor to perform operations comprising:

obtaining a text document;

generating a first plurality of mark-ups of the text document by processing the text document by a first plurality of natural language processing (NLP) models, wherein the first plurality of mark-ups comprises a first mark-up of the text document generated by a first NLP model of the first plurality of NLP models, wherein the first plurality of NLP models comprises a plurality of different types of NLP models configured to generate a plurality of different types of mark-ups each of which provides a corresponding coarse representation of the text document, wherein the first plurality of mark-ups comprises the plurality of different types of mark-ups;

displaying, by way of a user interface, the text document and the first plurality of mark-ups of the text document;

receiving a user selection of a portion of the first mark-up of the text document from the first plurality of mark-ups, wherein the portion of the first mark-up of the text document is associated with a portion of the text document;

in response to the user selection of the portion of the first mark-up of the text document, selecting, from a second plurality of NLP models and using a mapping, a second NLP model by which to process the portion of the text document, wherein the second NLP model is different from the first NLP model, wherein the mapping associates each respective NLP model of the second plurality of NLP models with a corresponding mark-up of the first plurality of mark-ups, wherein each respective NLP model of the second plurality of NLP models is configured to generate a corresponding refined representation of the portion of the text document, and wherein the second NLP model is associated with the first mark-up of the text document;

based on selecting the second NLP model, generating a second mark-up of the text document by processing at least the portion of the text document by the second NLP model, wherein the second mark-up provides the corresponding refined representation of the portion of the text document; and displaying, by way of the user interface, the text document and the second mark-up of the text document.

19. A non-transitory computer-readable medium having stored thereon instructions that, when executed by a computing device, cause the computing device to perform operations comprising:

obtaining a text document;

generating a first plurality of mark-ups of the text document by processing the text document by a first plurality of natural language processing (NLP) models, wherein the first plurality of mark-ups comprises a first mark-up of the text document generated by a first NLP model of the first plurality of NLP models, wherein the first plurality of NLP models comprises a plurality of different types of NLP models configured to generate a plurality of different types of mark-ups each of which provides a corresponding coarse representation of the text document, wherein the first plurality of mark-ups comprises the plurality of different types of mark-ups;

displaying, by way of a user interface, the text document and the first plurality of mark-ups of the text document;

receiving a user selection of a portion of the first mark-up of the text document from the first plurality of mark-ups, wherein the portion of the first mark-up of the text document is associated with a portion of the text document;

in response to the user selection of the portion of the first mark-up of the text document, selecting, from a second plurality of NLP models and using a mapping, a second NLP model by which to process the portion of the text document, wherein the second NLP model is different from the first NLP model, wherein the mapping associates each respective NLP model of the second plurality of NLP models with a corresponding mark-up of the first plurality of mark-ups, wherein each respective NLP model of the second plurality of NLP models is configured to generate a corresponding refined representation of the portion of the text document, and wherein the second NLP model is associated with the first mark-up of the text document;

based on selecting the second NLP model, generating a second mark-up of the text document by processing at least the portion of the text document by the second NLP model, wherein the second mark-up provides the corresponding refined representation of the portion of the text document; and displaying, by way of the user interface, the text document and the second mark-up of the text document.

20. The system of claim 18, wherein the first mark-up is generated prior to and independently of user interactions with the text document.

* * * * *